(12) United States Patent
Smith et al.

(10) Patent No.: US 12,459,896 B2
(45) Date of Patent: *Nov. 4, 2025

(54) PROCESS FOR PREPARING 4-METHYL-2-PROPAN-2-YL-PYRIDINE-3-CARBONITRILE

(71) Applicant: AMGEN INC., Thousand Oaks, CA (US)

(72) Inventors: Austin Gerald Smith, Cary, NC (US); Padmini Kavuru Ananthoji, Townsend, MA (US); Peter Dornan, Stoneham, MA (US); Xijie Dai, Winchester, MA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/988,131

(22) Filed: Dec. 19, 2024

(65) Prior Publication Data

US 2025/0206705 A1    Jun. 26, 2025

Related U.S. Application Data

(63) Continuation of application No. 18/842,194, filed as application No. PCT/US2023/063755 on Mar. 6, 2023.

(60) Provisional application No. 63/317,187, filed on Mar. 7, 2022.

(51) Int. Cl.
*C07D 471/04* (2006.01)
*C07D 207/06* (2006.01)
*C07D 213/73* (2006.01)
*C07D 213/82* (2006.01)
*C07D 213/85* (2006.01)

(52) U.S. Cl.
CPC ......... *C07D 213/85* (2013.01); *C07D 207/06* (2013.01); *C07D 213/73* (2013.01); *C07D 213/82* (2013.01); *C07D 471/04* (2013.01)

(58) Field of Classification Search
CPC .................................................. C07D 213/85
USPC ....................................................... 544/279
See application file for complete search history.

(56) References Cited

U.S. PATENT DOCUMENTS

| | | | |
|---|---|---|---|
| 5,100,883 A | 3/1992 | Schiehser | |
| 5,118,677 A | 6/1992 | Caufield | |
| 5,118,678 A | 6/1992 | Kao et al. | |
| 5,120,842 A | 6/1992 | Failli et al. | |
| 5,151,413 A | 9/1992 | Caufield et al. | |
| 5,256,790 A | 10/1993 | Nelson | |
| 5,258,389 A | 11/1993 | Goulet et al. | |
| 5,521,184 A | 5/1996 | Zimmermann | |
| 5,650,415 A | 7/1997 | Tang et al. | |
| 5,656,643 A | 8/1997 | Spada et al. | |
| 5,712,291 A | 1/1998 | D'Amato | |
| 5,728,813 A | 3/1998 | Lyman et al. | |
| 5,747,498 A | 5/1998 | Schnur et al. | |
| 5,770,599 A | 6/1998 | Gibson | |
| 5,789,427 A | 8/1998 | Chen et al. | |
| 5,792,783 A | 8/1998 | Tang et al. | |
| 5,861,510 A | 1/1999 | Piscopio et al. | |
| 5,863,949 A | 1/1999 | Robinson et al. | |
| 5,892,112 A | 4/1999 | Levy et al. | |
| 5,969,110 A | 10/1999 | Beckmann et al. | |
| 5,981,245 A | 11/1999 | Fox et al. | |
| 5,990,141 A | 11/1999 | Hirth et al. | |
| 6,057,124 A | 5/2000 | Bartley et al. | |
| 6,111,090 A | 8/2000 | Gorman et al. | |
| 6,232,447 B1 | 5/2001 | Cerretti | |
| 6,235,764 B1 | 5/2001 | Larson et al. | |
| 6,258,812 B1 | 7/2001 | Bold et al. | |
| 6,413,932 B1 | 7/2002 | Cerretti et al. | |
| 6,515,004 B1 | 2/2003 | Misra et al. | |
| 6,596,852 B2 | 7/2003 | Cerretti et al. | |
| 6,630,500 B2 | 10/2003 | Gingrich et al. | |
| 6,656,963 B2 | 12/2003 | Firestone et al. | |

(Continued)

FOREIGN PATENT DOCUMENTS

| | | | |
|---|---|---|---|
| CN | 111205286 A | 5/2020 | |
| CN | 112479993 A | 3/2021 | |

(Continued)

OTHER PUBLICATIONS

Dai et al., The Journal of Organic Chemistry, 2022, 87, pp. 8437-8444.*
Bagley et al., Rapid synthesis of 3-cyanopyridine-derived chromophores with two-dimensional tunability and solvatochromic photophysical properties, Chem. Commun. 5165-7 (2009).
Canon, et al., "The clinical KRAS(G12C) inhibitor AMG 510 drives anti-tumour immunity," Nature, 575(7781): 217-223 (2019) (Supplementary Material, pp. 1-55).
Ciufolini et al., A Unified Strategy for the Synthesis of Phenanthroizidine Alkaloids: Preparation of Sterically Congested Pyrides, J. Am. Chem. Soc. 118:12082-9 (1996).

(Continued)

*Primary Examiner* — Niloofar Rahmani

(57) ABSTRACT

Provided herein are processes for preparing Compound A or a salt thereof, comprising admixing Compound B or a salt thereof and crotonaldehyde in the presence of an acid catalyst and a solvent to form Compound A

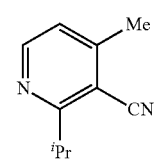

(A)

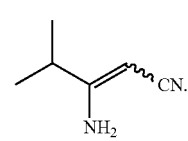

(B)

22 Claims, 6 Drawing Sheets

(56) References Cited

U.S. PATENT DOCUMENTS

| | | | |
|---|---|---|---|
| 6,713,485 | B2 | 3/2004 | Carter et al. |
| 6,727,225 | B2 | 4/2004 | Wiley |
| 7,025,962 | B1 | 4/2006 | Gorman et al. |
| 7,618,632 | B2 | 11/2009 | Collins et al. |
| 7,812,135 | B2 | 10/2010 | Smith et al. |
| 8,388,967 | B2 | 3/2013 | Smith et al. |
| 8,586,023 | B2 | 11/2013 | Shiku et al. |
| 8,591,886 | B2 | 11/2013 | Ponath et al. |
| 10,519,146 | B2 | 12/2019 | Lanman et al. |
| 10,532,042 | B2 | 1/2020 | Lanman et al. |
| 11,285,135 | B2 | 3/2022 | Lanman et al. |
| 11,905,281 | B2 | 2/2024 | Lanman et al. |
| 2002/0042368 | A1 | 4/2002 | Fanslow et al. |
| 2003/0105091 | A1 | 6/2003 | Riedl et al. |
| 2003/0162712 | A1 | 8/2003 | Cerretti et al. |
| 2009/0012085 | A1 | 1/2009 | Baum et al. |
| 2010/0022596 | A1 | 1/2010 | Karl-Heinz |
| 2018/0334454 | A1 | 11/2018 | Lanman et al. |
| 2020/0055845 | A1 | 2/2020 | Lanman et al. |
| 2021/0009577 | A1 | 1/2021 | Lanman et al. |
| 2022/0168280 | A1 | 6/2022 | Lanman et al. |
| 2022/0259150 | A1 | 8/2022 | Wu et al. |
| 2023/0192681 | A1 | 6/2023 | Lanman et al. |

FOREIGN PATENT DOCUMENTS

| | | | |
|---|---|---|---|
| DE | 19629652 | A1 | 1/1998 |
| EP | 0090505 | A2 | 10/1983 |
| EP | 0407122 | A1 | 1/1991 |
| EP | 0520722 | A1 | 12/1992 |
| EP | 0566226 | A1 | 10/1993 |
| EP | 0606046 | A1 | 7/1994 |
| EP | 0682027 | A1 | 11/1995 |
| EP | 0770622 | A2 | 5/1997 |
| EP | 0780386 | A1 | 6/1997 |
| EP | 0787772 | A2 | 8/1997 |
| EP | 0818442 | A1 | 1/1998 |
| EP | 0837063 | A1 | 4/1998 |
| EP | 0931788 | A1 | 7/1999 |
| EP | 1004578 | A1 | 5/2000 |
| EP | 1181017 | A1 | 2/2002 |
| EP | 0970070 | B1 | 10/2004 |
| EP | 1786785 | A2 | 5/2007 |
| EP | 1866339 | A2 | 12/2007 |
| EP | 1947183 | A1 | 7/2008 |
| JP | 02-233610 | A | 9/1990 |
| WO | 90/05719 | A1 | 5/1990 |
| WO | 92/05179 | A1 | 4/1992 |
| WO | 92/20642 | A1 | 11/1992 |
| WO | 93/11130 | A1 | 6/1993 |
| WO | 94/02136 | A1 | 2/1994 |
| WO | 94/02485 | A1 | 2/1994 |
| WO | 94/09010 | A1 | 4/1994 |
| WO | 95/09847 | A1 | 4/1995 |
| WO | 95/14023 | A1 | 5/1995 |
| WO | 95/16691 | A1 | 6/1995 |
| WO | 95/19774 | A1 | 7/1995 |
| WO | 95/19970 | A1 | 7/1995 |
| WO | 96/27583 | A1 | 9/1996 |
| WO | 96/30347 | A1 | 10/1996 |
| WO | 96/31510 | A1 | 10/1996 |
| WO | 96/33172 | A1 | 10/1996 |
| WO | 96/33980 | A1 | 10/1996 |
| WO | 96/41807 | A1 | 12/1996 |
| WO | 97/02266 | A1 | 1/1997 |
| WO | 97/13771 | A1 | 4/1997 |
| WO | 97/19065 | A1 | 5/1997 |
| WO | 97/27199 | A1 | 7/1997 |
| WO | 97/30034 | A1 | 8/1997 |
| WO | 97/30044 | A1 | 8/1997 |
| WO | 97/32880 | A1 | 9/1997 |
| WO | 97/32881 | A1 | 9/1997 |
| WO | 97/34895 | A1 | 9/1997 |
| WO | 97/38983 | A1 | 10/1997 |
| WO | 97/38994 | A1 | 10/1997 |
| WO | 97/49688 | A1 | 12/1997 |
| WO | 98/02434 | A1 | 1/1998 |
| WO | 98/02437 | A1 | 1/1998 |
| WO | 98/02438 | A1 | 1/1998 |
| WO | 98/02441 | A2 | 1/1998 |
| WO | 98/03516 | A1 | 1/1998 |
| WO | 98/07697 | A1 | 2/1998 |
| WO | 98/07726 | A1 | 2/1998 |
| WO | 98/14449 | A1 | 4/1998 |
| WO | 98/14450 | A1 | 4/1998 |
| WO | 98/14451 | A1 | 4/1998 |
| WO | 98/17662 | A1 | 4/1998 |
| WO | 98/30566 | A1 | 7/1998 |
| WO | 98/33768 | A1 | 8/1998 |
| WO | 98/33798 | A2 | 8/1998 |
| WO | 98/34915 | A1 | 8/1998 |
| WO | 98/34918 | A1 | 8/1998 |
| WO | 99/07675 | A1 | 2/1999 |
| WO | 99/07701 | A1 | 2/1999 |
| WO | 99/20758 | A1 | 4/1999 |
| WO | 99/29667 | A1 | 6/1999 |
| WO | 99/35132 | A1 | 7/1999 |
| WO | 99/35146 | A1 | 7/1999 |
| WO | 99/40196 | A1 | 8/1999 |
| WO | 99/45009 | A1 | 9/1999 |
| WO | 99/52889 | A1 | 10/1999 |
| WO | 99/52910 | A1 | 10/1999 |
| WO | 99/61422 | A1 | 12/1999 |
| WO | 00/02871 | A1 | 1/2000 |
| WO | 00/12089 | A1 | 3/2000 |
| WO | 00/59509 | A1 | 10/2000 |
| WO | 01/03720 | A2 | 1/2001 |
| WO | 01/14387 | A1 | 3/2001 |
| WO | 01/32651 | A1 | 5/2001 |
| WO | 01/37820 | A2 | 5/2001 |
| WO | 02/55501 | A2 | 7/2002 |
| WO | 02/59110 | A1 | 8/2002 |
| WO | 02/66470 | A1 | 8/2002 |
| WO | 02/68406 | A2 | 9/2002 |
| WO | 2004/005279 | A2 | 1/2004 |
| WO | 2004/007458 | A1 | 1/2004 |
| WO | 2004/007481 | A2 | 1/2004 |
| WO | 2004/009784 | A2 | 1/2004 |
| WO | 2005/005434 | A1 | 1/2005 |
| WO | 2005/007190 | A1 | 1/2005 |
| WO | 2005/011700 | A1 | 2/2005 |
| WO | 2005/016252 | A2 | 2/2005 |
| WO | 2005/055808 | A2 | 6/2005 |
| WO | 2005/115451 | A2 | 12/2005 |
| WO | 2006/044453 | A1 | 4/2006 |
| WO | 2006/083289 | A2 | 8/2006 |
| WO | 2006/121168 | A1 | 11/2006 |
| WO | 2006/122806 | A2 | 11/2006 |
| WO | 2007/133822 | A1 | 11/2007 |
| WO | 2008/070740 | A1 | 6/2008 |
| WO | 2009/036082 | A2 | 3/2009 |
| WO | 2009/055730 | A1 | 4/2009 |
| WO | 2010/003118 | A1 | 1/2010 |
| WO | 2011/028683 | | 3/2011 |
| WO | 2011/051726 | A2 | 5/2011 |
| WO | 2011/090754 | A1 | 7/2011 |
| WO | 2013/039954 | A1 | 3/2013 |
| WO | 2016118586 | A1 | 7/2016 |
| WO | 2018119183 | A3 | 6/2018 |
| WO | 2018217651 | A1 | 11/2018 |
| WO | 2019051291 | A1 | 3/2019 |
| WO | 2019213516 | A1 | 11/2019 |
| WO | 2019213526 | A1 | 11/2019 |
| WO | 2019217691 | A1 | 11/2019 |
| WO | 2019232419 | A1 | 12/2019 |
| WO | 2019241157 | A1 | 12/2019 |
| WO | 2019243533 | A1 | 12/2019 |
| WO | 2019243535 | A1 | 12/2019 |
| WO | 2020050890 | A2 | 3/2020 |
| WO | 2020/102730 | A1 | 5/2020 |
| WO | 2021047603 | A1 | 3/2021 |
| WO | 2021/097212 | A1 | 5/2021 |
| WO | 2021097207 | A1 | 5/2021 |

(56) References Cited

FOREIGN PATENT DOCUMENTS

| WO | 2021/123294 A1 | 6/2021 |
| WO | 2022/076623 A1 | 4/2022 |
| WO | 2022/109242 A1 | 5/2022 |

OTHER PUBLICATIONS

Ciufolini et al., Modified Knoevenagel- Stobbe preparation of Substituted Pyridines: a New Approach to Streptonigrinoids, J. Chem. Soc. Chem. Commun., 1230 (1988).
Dai et al., Synthesis of Substituted Pyridines via Formal (3+3) Cycloaddition of Enamines with Unsaturated Aldehydes and Ketones, J. Org. Chem., 87:8437-44 (2022).
Database Registry [Online], Chemical Abstracts Service, Columbus, Ohio, US; Jul. 31, 2017 (Jul. 31, 2017), XP002801805, retrieved from STN Database accession No. 2105944-09-8.
Hirai et al., Tailor-made synthesis of fully alkylated/arylatednicotinates by FeCl3-mediated condensation of enamino esters with enones, Chem. Commun. 53:2390 (2017).
International Search Report and Written Opinion, PCT/US2020/060415, dated Feb. 3, 2021.
International Search Report and Written Opinion, PCT/US2023/063755, dated May 25, 2023.
Kato et al., Studies on Ketene and Its Derivatives LXXXI. Reaction of B-Amino crotonamide with a, B-Unsaturated Ketones, Chem. Parhm. Bull. 24:1408 (1976).
Katritzky et al., A Simple and Versatile Route to Novel Conjugated â-Enaminonitriles and Their Application for the Highly Regioselective Synthesis of Nicotinonitriles Using a Vilsmeier-Type Reagent, J. Org. Chem., 64:6076-9 (1999).
Kong et al., Cascade Reactions Utilizing the Nucleophilic Properties of 1,1-Enediamines for the Regioselective Synthesis of 4-Aryl-2-aminopyridines, Chem. Select, 4:3083-7 (2019).
Sarkar et al., Atom-Economical Palladium Carbon-Catalyzed de Novo Synthesis of Trisubstituted Nicotinonitriles, J. Org. Chem. 82:9012-22 (2017).
Shibata et al., Syntheis of 4,6-Disubstituted 2-Methylpyridines and their 3-Carboxamides, J. Heterocyclic Chem. 30: 277 (1993).
Shibata et al., "A Convenient Synthesis of 3-Cyano-2-methylpyridines under Ultrasonic Irradiation," Bull. Chem. Soc. Jpn., 61:2199-2200 (1988).
Song et al., One-Pot Reactions for Modular Synthesis of Polysubstituted and Fused Pyridines, Org. Lett. 18:5640-3 (2016).
Stanetty et al., "Synthesis of Aza Analogs of the Herbicide Sindone B," Monatshefte Fuer Chemie, 130:441-450 (1999).
Taylor et al., Synthesis of D,L-7,10-Ethano-5-deazaaminopterin and L-7,10-Ethano-5-deazafolic Acid, J. Org. Chem., 50:1005-10 (1985).
Wei et al., Modular Pyridine Synthesis from Oximes and Enals through Synergistic Copper/Iminium Catalysis, J. Org. Chem. 135:3756-9 (2013).
4-methyl-2-(1-methylethyl)-3-Pyridinamine, STN Registry, CAS RN 1698293-93-4, STN entry date May 5, 2015 (May 5, 2015).
"GTPase KRas isoform a [Homo sapiens]," Accession No. NP203524, Aug. 12, 2024, pp. 4.
ATTC "Organism: Mus musculus (B cell); Mus musculus (myeloma), mouse (B cell); mouse (myeloma)," Accession No. HB-8508, retrieved from https://www.atcc.org/~/media/0DF7351153724BD6A3E7D78D5BA2F933.ashx, on Nov. 29, 2018.
Barnett et al., "Identification and characterization of pleckstrin-homology-domain-dependent and isoenzyme-specific Akt inhibitors," Biochem J., 385:399-408 (2005).
Biernacka et al. "The potential utility of re-mining results of somatic mutation testing: KRAS status in lung adenocarcinoma" in Cancer Genet., 209:195 (2016).
Carlone et al., "A simple asymmetric organocatalytic approach to optically active cyclohexenones", Chemical Communications, 47:4928-4930 (2006).
Clarke et al. "Dissecting mechanisms of resistance to targeted drug combination therapy in human colorectal cancer" in Oncogene, 38:5076-90 (2019).
Cox et al., "Drugging the undruggable RAS: mission possible?" in Nat Rev Drug Discov., 13:828-51 (2014).
Dasmahapatra et al., "In vitro Combination Treatment with Perifosine and UCN-01 Demonstrates Synergism against Prostate (PC-3) and Lung (A549) Epithelial Adenocarcinoma Cell Lines," Clin. Cancer Res., 10(15): 5242-52 (2004).
Del Re et al. "Implications of KRAS mutations in acquired resistance to treatment in NSCLC" in Oncotarget., 9:6630-43 (2017).
Fiala et al. "G12V and G12A KRAS mutations are associated with poor outcome in patients with metastatic colorectal cancer treated with bevacizumab" in Tumour Biol., 37:6823-30 (2016).
Giils et al., "The development of phosphatidylinositol ether lipid analogues as inhibitors of the serine/threonine kinase, Akt," Expert. Opin. Investig. Drugs, 13:787-797. (2004).
Goldberg et al., "Role of PD-1 and its ligand, B7-H1, in early fate decisions of CD8 T cells," Blood, The Journal of the American Society of Hematology, 110(1):186-192 (2007).
Goldstein et al., "Biological efficacy of a chimeric antibody to the epidermal growth factor receptor in a human tumor xenograft model.," Clin. Cancer Res., 1:1311-1318 (1995).
Huang et al., "Epidermal growth factor receptor blockade with C225 modulates proliferation, apoptosis, and radiosensitivity in squamous cell carcinomas of the head and neck, " Cancer Res, 59(8):1935-1940 (1999).
Jin et al., "Inhibition of AKT survival pathway by a small molecule inhibitor in human endometrial cancer cells, " Br. J Cancer, 91, 1808-1812 (2004).
Jones et al. "Specific mutations in KRAS codon 12 are associated with worse overall survival in patients with advanced and recurrent colorectal cancer," Br J Cancer, 116:923-9 (2017).
Kargbo Rb. "Inhibitors of G12C mutant Ras proteins for the treatment of cancers", ACS Med Chem Lett 10:10-1 (2018).
Lievre, "KRAS mutation status is predictive of response to cetuximab therapy in colorectal cancer" Cancer Res 66:3992-5 (2006).
Lito et al., "Allele-specific inhibitors inactivate mutant Kras G12C by a trapping mechanism" Science, 351:604-8 (2016).
Massarelli et al. "KRAS mutation is an important predictor of resistance to therapy with epidermal growth factor receptor tyrosine kinase inhibitors in non-small-cell lung cancer" Clin Cancer Res 13:2890-6 (2007).
McCormick F. "K-Ras protein as a drug target" J Mol Med (Berl) 94:253-8 (2016).
Modjtahedi et al., "The human EGF receptor as a target for cancer therapy: six new rat mAbs against the receptor on the breast carcinoma MDA-MB 468," British journal of cancer, 67(2):247-253 (1993).
Nadai et al. "KRAS-G12C mutation is associated with poor outcome in surgically resected lung adenocarcinoma" J Thorac Oncol 9:1513-22 (2014).
Neumann et al., "Frequency and type of KRAS mutations in routine diagnostic analysis of metastatic colorectal cancer" Pathol Res Pract 205:858-62 (2009).
Ostrem et al., "K-Ras(G12C) inhibitors allosterically control GTP affinity and effector interactions" Nature 503:548-51 (2013).
Ostrem et al., "Direct small molecule inhibitors of KRAS: from structural insights to mechanism-based design" Nat Rev Drug Discov 15:771-85 (2016).
Ouerhani et al., "The mutational spectrum of HRAS, KRAS, NRAS and FGFR3 genes in bladder cancer" Cancer Biomark 10:259-66 (2011-2012).
Paez et al., "EGFR Mutations in Lung Cancer: Correlation with Clinical Response to Gefitinib Therapy," Science, 304, Issue 5676, 1497-500 (2004).
Parsons, et al., Axial Chirality in the Sotorasib Drug Substance, Part 1: Development of a Classical Resolution to Prepare an Atropisomerically Pure Sotorasib Intermediate, Org. Process res. Dev. 26: 2629-2635 (2022).
Patricelli et al. "Selective inhibition of oncogenic KRAS output with small molecules targeting the inactive state" in Cancer Discov 6:316-29 (2016).

(56) References Cited

OTHER PUBLICATIONS

Remington's Pharmaceutical Sciences, 18th Edition, A.R. Gennaro, Chapter 75:1435-1712 (1990) (280 pages).

Sarkar et al., "Indole-3-carbinol and prostate cancer," J. Nutr., 134:3493S-3498S. (2004).

Simanshu et al., "RAS proteins and their regulators in human disease" *Cell* 170:17-33 (2017).

Suzawa et al. "Activation of KRAS mediates resistance to targeted therapy in MET exon 14-mutant non-small cell lung cancer" in *Clin Cancer Res* 25:1248-60 (2019).

Teramoto et al., "Inhibitory effect of anti-epidermal growth factor receptor antibody on a human gastric cancer," Cancer, 77, 639-645 (1996).

Thompson et al., "PD-1 is expressed by tumor-infiltrating immune cells and is associated with poor outcome for patients with renal cell carcinoma, " Clin. Cancer Res., 13(6): 1757-1761 (2007).

Traxler P., "Tyrosine kinase inhibitors in cancer treatment (part II)," Exp. Opin. Ther. Patents, 8(12):1599-1625. (1998).

Verghese et al., "Increasing global access to the high-vol. HIV drug nevirapine through process intensification." *Green Chemistry* 19(13):2986-2991 (2017).

Wei et al., "Modular Pyridine Synthesis from Oximes and Enals through Synergistic Copper/Iminium Catalysis," JAS. 135:3756-9 (2013).

Yan et al., "Pharmacogenetics and pharmacogenomics in oncology therapeutic antibody development," Biotechniques, 39(4):565-568 (2005).

Yang et al., "Akt/protein kinase B signaling inhibitor-2, a selective small molecule inhibitor of Akt signaling with antitumor activity in cancer cells overexpressing Akt," Cancer Res., 64:4394-4399 (2004).

Yang et al., "Eradication of established tumors by a fully human monoclonal antibody to the epidermal growth factor receptor without concomitant hemotherapy," Cancer Res., 59:1236-1243. (1999).

Notice of Allowance, mailed Oct. 3, 2023, for U.S. Appl. No. 17/031,607, 7 pages.

Non-Final Office Action for U.S. Appl. No. 17/031,607, mailed Mar. 31, 2023, 7 pages.

Restriction Requirement, mailed Apr. 14, 2022, for U.S. Appl. No. 17/031,607, 5 pages.

* cited by examiner

PROCESS FOR PREPARING 4-METHYL-2-PROPAN-2-YL-PYRIDINE-3-CARBONITRILE

CROSS REFERENCE TO RELATED APPLICATIONS

This application is a continuation of U.S. application Ser. No. 18/842,194, filed Aug. 28, 2024, which is a national stage application under 35 U.S.C. § 371 of International Application No. PCT/US2023/063755, filed Mar. 6, 2023, which claims the benefit of priority to U.S. Provisional Patent Application No. 63/317,187, filed Mar. 7, 2022. Each of the foregoing applications is incorporated herein by reference in its entirety.

BACKGROUND

KIRSTEN RAT SARCOMA VIRAL ONCOGENE homologue (KRAS) is the most frequently mutated oncogene in human cancers and encodes a guanosine triphosphatase (GTPase) that cycles between active guanosine triphosphate (GTP)-bound and inactive guanosine diphosphate (GDP)-bound states to regulate signal transduction. See, for example, Simanshu D K, Nissley D V, McCormick F. "RAS proteins and their regulators in human disease" in *Cell* 2017; 170:17-33.

KRAS mutations are often associated with resistance to targeted therapies and poor outcomes in patients with cancer, yet no selective KRAS inhibitor has been approved despite more than three decades of scientific effort. See, for example, Nadal E, Chen G, Prensner J R, et al. "KRAS-G12C mutation is associated with poor outcome in surgically resected lung adenocarcinoma" in *J Thorac Oncol* 2014; 9:1513-22; Massarelli E, Varella-Garcia M, Tang X, et al. "KRAS mutation is an important predictor of resistance to therapy with epidermal growth factor receptor tyrosine kinase inhibitors in non-small-cell lung cancer" in *Clin Cancer Res* 2007; 13:2890-6; Fiala O, Buchler T, Mohelnikova-Duchonova B, et al. "G12V and G12A KRAS mutations are associated with poor outcome in patients with metastatic colorectal cancer treated with bevacizumab" in *Tumour Biol* 2016; 37:6823-30; Lievre A, Bachet J-B, Le Corre D, et al. "KRAS mutation status is predictive of response to cetuximab therapy in colorectal cancer" in *Cancer Res* 2006; 66:3992-5; McCormick F. "K-Ras protein as a drug target" in *J Mol Med* (Berl) 2016; 94:253-8; Jones R P, Sutton P A, Evans J P, et al. "Specific mutations in KRAS codon 12 are associated with worse overall survival in patients with advanced and recurrent colorectal cancer" in *Br J Cancer* 2017; 116:923-9; Cox A D, Fesik S W, Kimmelman A C, Luo J, Der C J. "Drugging the undruggable RAS: mission possible?" in *Nat Rev Drug Discov* 2014; 13:828-51; Ostrem J M L, Shokat K M. "Direct small molecule inhibitors of KRAS: from structural insights to mechanism-based design" in *Nat Rev Drug Discov* 2016; 15:771-85; Suzawa K, Offin M, Lu D, et al. "Activation of KRAS mediates resistance to targeted therapy in MET exon 14-mutant non-small cell lung cancer" in *Clin Cancer Res* 2019; 25:1248-60; Clarke P A, Roe T, Swabey K, et al. "Dissecting mechanisms of resistance to targeted drug combination therapy in human colorectal cancer" in *Oncogene* 2019; 38:5076-90; and Del Re M, Rofi E, Restante G, et al. "Implications of KRAS mutations in acquired resistance to treatment in NSCLC" in *Oncotarget* 2017; 9:6630-43.

The KRAS G12C mutation occurs in approximately 13% of non-small-cell lung cancers (NSCLCs) and in 1 to 3% of colorectal cancers and other solid cancers. See, for example, Cox A D, Fesik S W, Kimmelman A C, Luo J, Der C J. "Drugging the undruggable RAS: mission possible?" in *Nat Rev Drug Discov* 2014; 13:828-51; Biernacka A, Tsongalis P D, Peterson J D, et al. "The potential utility of re-mining results of somatic mutation testing: KRAS status in lung adenocarcinoma" in *Cancer Genet* 2016; 209:195-8; Neumann J, Zeindl-Eberhart E, Kirchner T, Jung A. "Frequency and type of KRAS mutations in routine diagnostic analysis of metastatic colorectal cancer" in *Pathol Res Pract* 2009; 205:858-62; and Ouerhani S, Elgaaied A B A. "The mutational spectrum of HRAS, KRAS, NRAS and FGFR3 genes in bladder cancer" in *Cancer Biomark* 2011-2012; 10:259-66.

The glycine-to-cysteine mutation at position 12 favors the active form of the KRAS protein, resulting in a predominantly GTP-bound KRAS oncoprotein and enhanced proliferation and survival in tumor cells. See, for example, Ostrem J M, Peters U, Sos M L, Wells J A, Shokat K M. "K-Ras (G12C) inhibitors allosterically control GTP affinity and effector interactions" in *Nature* 2013; 503:548-51 and Kargbo R B. "Inhibitors of G12C mutant Ras proteins for the treatment of cancers" in *ACS Med Chem Lett* 2018; 10:10-1.

The mutated cysteine resides next to a pocket (P2) of the switch II region. The P2 pocket is present only in the inactive GDP-bound conformation of KRAS and has been exploited to establish covalent inhibitors of KRAS$^{G12C}$. See, for example, Ostrem J M, Peters U, Sos M L, Wells J A, Shokat K M. "K-Ras (G12C) inhibitors allosterically control GTP affinity and effector interactions" in *Nature* 2013; 503:548-51; Lito P, Solomon M, Li L-S, Hansen R, Rosen N. "Allele-specific inhibitors inactivate mutant KRAS$^{G12C}$ by a trapping mechanism" in *Science* 2016; 351:604-8; and Patricelli M P, Janes M R, Li L-S, et al. "Selective inhibition of oncogenic KRAS output with small molecules targeting the inactive state" in *Cancer Discov* 2016; 6:316-29.

Sotorasib (also referred to as AMG 510, and marketed as LUMAKRAS®) is a small molecule that specifically and irreversibly inhibits KRAS$^{G12C}$ through a unique interaction with the P2 pocket. The inhibitor traps KRAS$^{G12C}$ in the inactive GDP-bound state by a mechanism similar to that described for other KRAS$^{G12C}$ inhibitors. See, for example, Lito P, Solomon M, Li L-S, Hansen R, Rosen N. "Allele-specific inhibitors inactivate mutant KRAS G12C by a trapping mechanism" in *Science* 2016; 351:604-8. Preclinical studies showed that AMG 510 inhibited nearly all detectable phosphorylation of extracellular signal-regulated kinase (ERK), a key downstream effector of KRAS, leading to durable complete tumor regression in mice bearing KRAS$^{G12C}$ tumors. See, for example, Canon J, Rex K, Saiki A Y, et al. "The clinical KRAS(G12C) inhibitor AMG 510 drives anti-tumour immunity" in *Nature* 2019; 575:217-23.

Sotorasib has the following chemical structure:

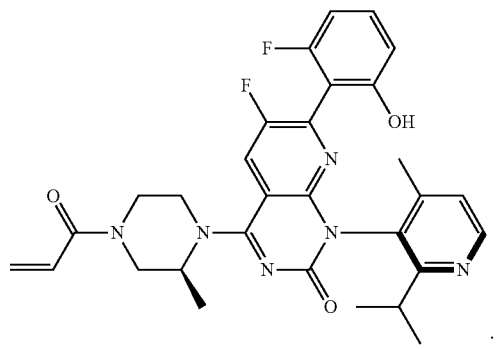

The compound has an atropisomeric chiral center, wherein in the (M)-configuration (shown above) is more active at the target protein than the (P)-configuration.

A synthetic intermediate in the synthesis of sotorasib is Compound A, which has an IUPAC name of 4-methyl-2-propan-2-yl-pyridine-3-carbonitrile (also known as 2-isopropyl-4-methylnicotinonitrile), and the following structure:

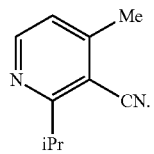

Compound A

Compound A can be converted into other compounds useful as synthetic intermediates in processes for preparing AMG 510. In view of the foregoing, there is a need for an efficient, scalable, cost-effective processes to manufacture Compound A or salts thereof.

SUMMARY

The disclosure provides processes for preparing Compound A or a salt thereof comprising admixing Compound B or a salt thereof and crotonaldehyde in a solvent and in the presence of a catalytic reagent to form Compound A or a salt thereof, wherein the catalytic reagent comprises an acid catalyst, an organocatalyst, or a combination thereof

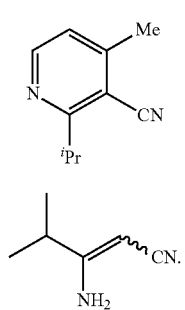

(A)

(B)

DETAILED DESCRIPTION

Figure 1A:
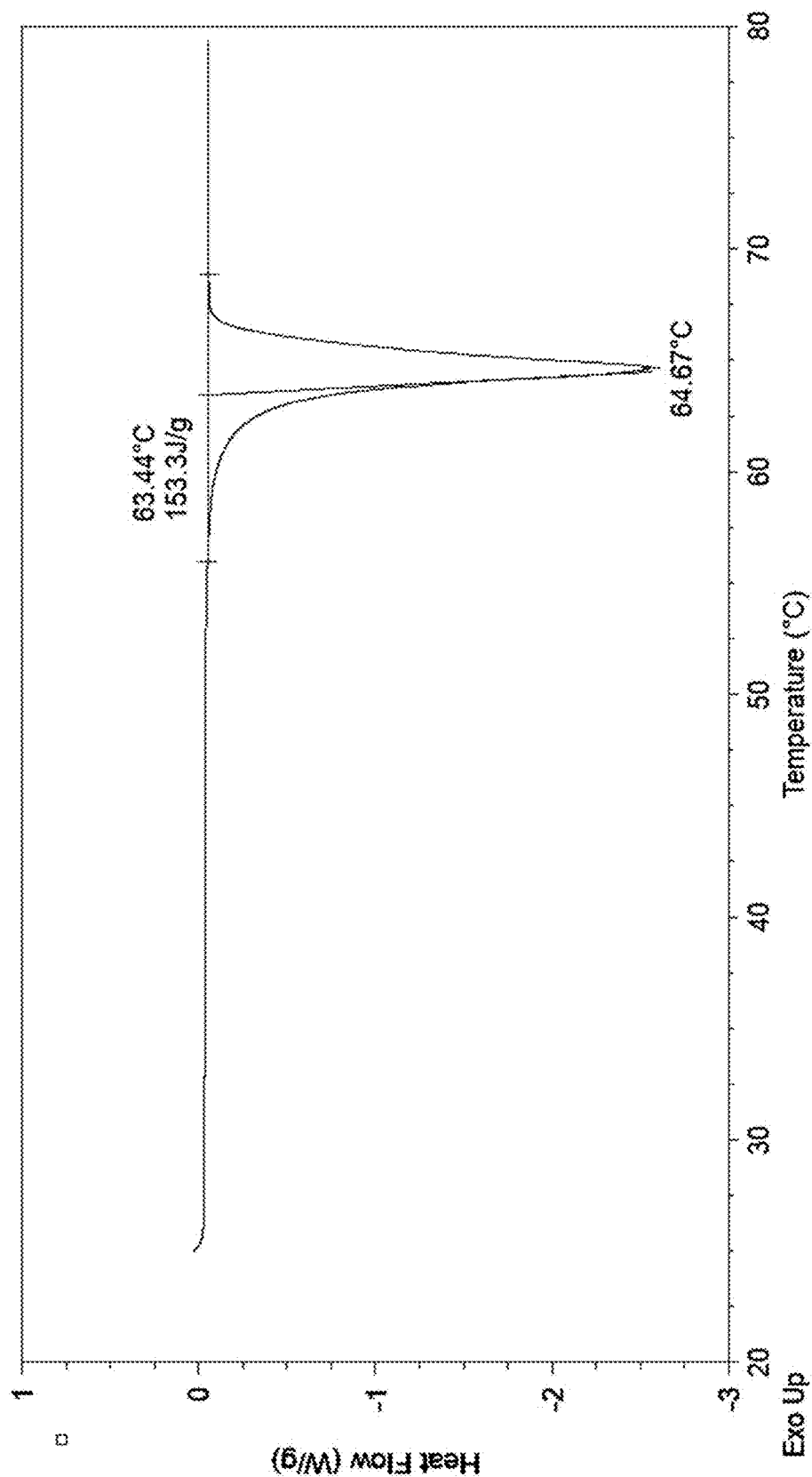
FIG. 1A shows the DSC of Compound G Form 2 isolated from crude.

The disclosure provides processes for preparing Compound A or a salt thereof. Without wishing to be bound to any particular theory, the disclosed processes involve a [3+3] cycloaddition of Compound B or a salt thereof and crotonaldehyde. In some embodiments, the disclosure provides processes for preparing Compound A or a salt thereof comprising admixing Compound B or a salt thereof and crotonaldehyde in a solvent and in the presence of a catalytic reagent comprising an acid catalyst, an organocatalyst, or a combination thereof to form Compound A.

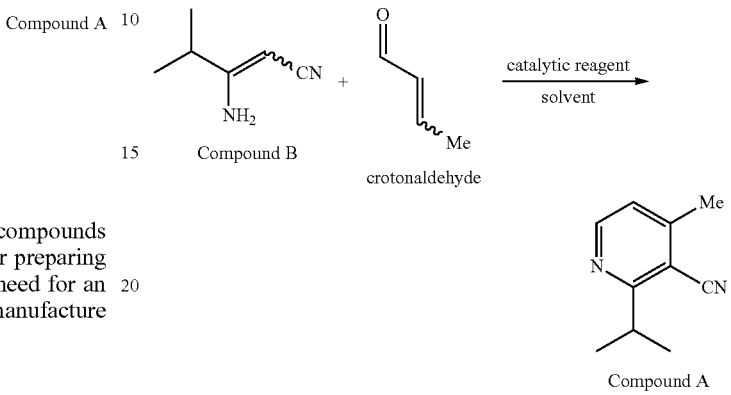

The disclosed processes advantageously provide Compound A or a salt thereof in high yield and purity with minimal amounts of side products such as, for example, Compound C, Compound D, and Compound E shown below.

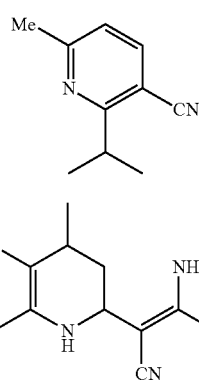

Compound C

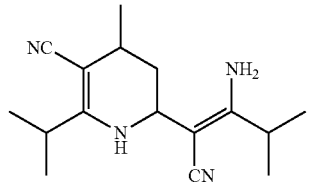

Compound D

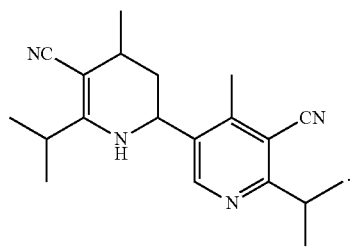

Compound E

As described herein, Compounds C-E are side products of the disclosed processes for preparing Compound A or a salt thereof from Compound B and crotonaldehyde. In some embodiments, the disclosed processes for preparing Compound A or a salt thereof provide at least one side product selected from Compound C or salt thereof, Compound D or a salt thereof, and Compound E or a salt thereof. In some embodiments, the disclosed processes for preparing Compound A or a salt thereof provide at least one side product comprising Compound C or salt thereof. The disclosed processes for preparing Compound A or a salt thereof typically provide Compound A as the major product. For example, in some embodiments, the disclosed processes for preparing Compound A or a salt thereof provide Compound A to Compound C at a molar ratio of 1.5:1 to 99:1 or greater (e.g., 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, or 99:1, or greater). In some embodiments, the disclosed processes for preparing Compound A or a salt thereof provide Compound A substantially free of Compound C. As used herein, the term "substantially free" refers to having not more than 5% of the referenced substance present (e.g., not having more than 5, 4, 3, 2, 1%). In some embodiments, substantially free refers to having not more than 0.5% of the reference substance present (e.g., not having more than 0.5, 0.4, 0.3, 0.2, 0.1%). In some embodiments, substantially free refers to the referenced substance being undetectable. In some embodiments, the molar ratio of Compound A to Compound C is greater than 99:1. Moreover, in some embodiments, in conjunction with other embodiments, the disclosed processes for preparing Compound A or a salt thereof provide Compound A to Compound D at a molar ratio of 1.5:1 to 99:1 or greater (e.g., 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, or 99:1, or greater). In some embodiments, the disclosed processes for preparing Compound A or a salt thereof provide Compound A substantially free of Compound D. Further, in some embodiments, the disclosed processes for preparing Compound A or a salt thereof provide Compound A to Compound E at a molar ratio of 1.5:1 to 99:1 or greater (e.g., 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, or 99:1, or greater). In some embodiments, the disclosed processes for preparing Compound A or a salt thereof provide Compound A substantially free of Compound E.

The disclosed processes are suitable for preparing Compound A on large scale, and thus are suitable for large scale syntheses of sotorasib. For example, in some embodiments Compound A or a salt thereof can be prepared on at least a 30 g scale in greater than 60% yield and greater than 90 wt %. As such, the disclosed processes for preparing Compound A or a salt thereof are useful for providing synthetic intermediates in the production of sotorasib. By way of example, Compound A can be converted into Compound F or a salt thereof, which in turn can be converted into Compound G or a salt thereof, which in turn can be used to form sotorasib. In some embodiments, the disclosed processes provide Compound G or a salt thereof on a scale of 50 g or more.

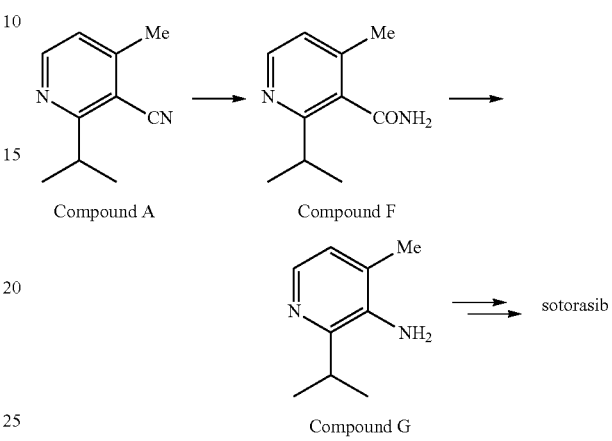

The processes disclosed herein processes provide several advantages over existing methodologies. For example, Compound G is the most expensive raw material in the synthesis of sotorasib accounting for a calculated 42.5% of raw material costs and 26% of the total cost of goods manufactured of the drug substance. The disclosed processes can concisely provide Compound G from two readily available chemical building blocks in 4 linear steps. By contrast, certain currently known synthetic routes to Compound G comprise several more steps. For example, Verghese J, Kong C J, Rivalti D, et al. "Increasing global access to the high-volume HIV drug nevirapine through process intensification." *Green Chemistry* 19.13 (2017): 2986-2991 ("Verghese") discloses a 5-step synthesis of 3-amino-2-chloro-4-methylpyridine ("CAPIC"), which can then be converted to Compound A with two additional steps. A comparison is shown below between a currently known route: 7 steps via the intermediate compound CAPIC as disclosed in Verghese with further conversion to Compound G (also referred to in the Scheme below as Compound 1) as disclosed in Chinese Published Patent Application No. CN 111205286 (Suzhou Institute of Drug Innovation) and PCT Publication No. WO2021/123294 (Bartolomé-Nebreda et al.—Janssen Pharmaceutica, N.V.) and an embodiment of the presently disclosed processes (4 steps).

7-Step Route to 1

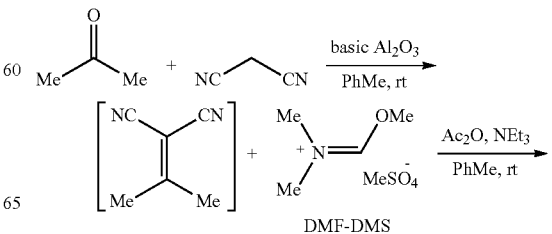

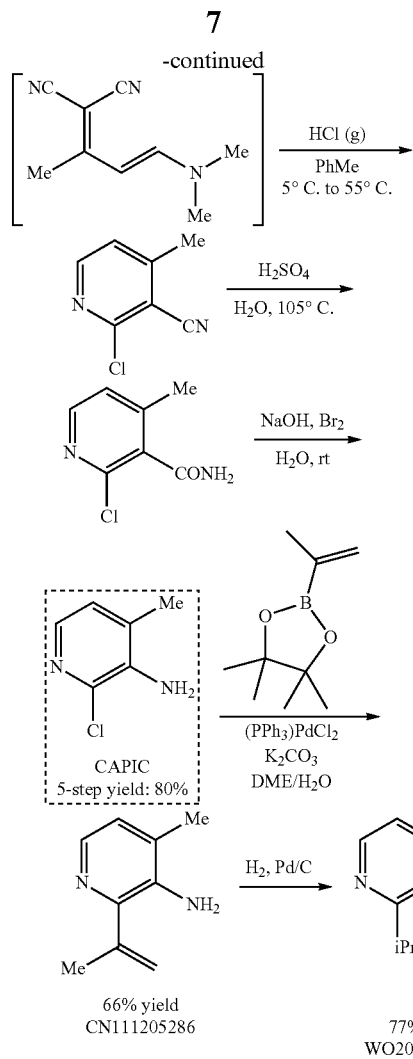

PCT Publication No. WO 2021/097207 (Corbett and Caille-Amgen Inc.) discloses a process for preparing Compound A, Compound F, and Compound G. See, for example, Schemes A1-A3 at pp. 63-67 as shown below, where Compound A is compound 35 in Schemes A2 and A3, Compound F is compound 36 in Scheme A2, and Compound G is compound 2A in Schemes A1-A3. Scheme A1 below provides a procedure for the synthesis of 2-isopropyl-4-methylpyridin-3-amine. Scheme A2 below provides a procedure for the synthesis of 2-isopropyl-4-methylpyridin-3-amine. Scheme A3 below provides a route of synthesis for aniline via 2-isopropyl-4-methylnicotinonitrile.

Scheme A1.

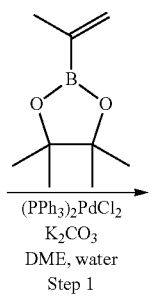

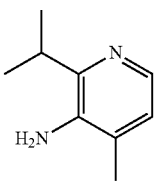

4-Step Route to Compound G

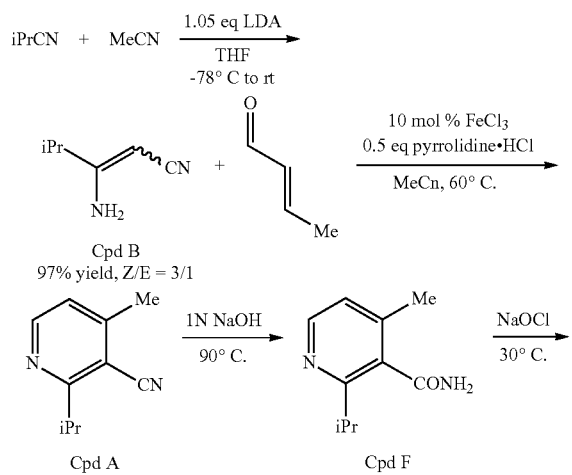

Scheme A2.

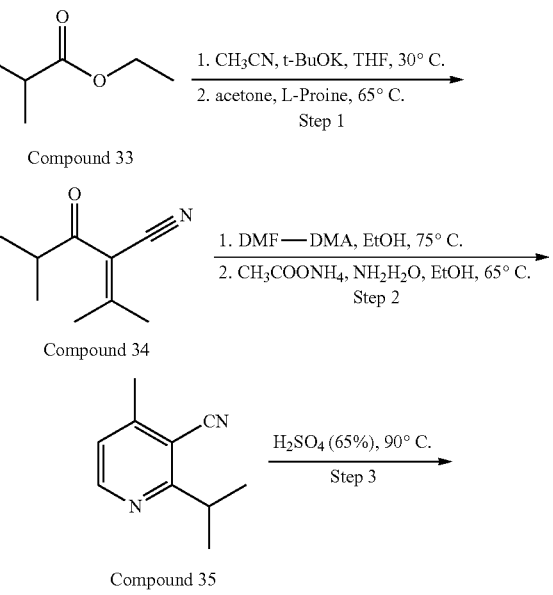

-continued

Compound 36 → Compound 2A

NaOH (1M), NaOCl
0-70° C., 18 h
Step 4

Scheme A3.

4-methyl-3-oxopentanenitrile (Molecular Weight: 111.14) + (E)-but-2-enal (Molecular Weight: 70.09)

→ [pyrrolidine catalyst with Ar, Ar, OTMS] or Bn₂NH (5 mol %), neat, 20° C.

→ Compound 36 [intermediate]

NH₂OH—HCl (2.0 equiv), MeCN (5 V), 80° C.

→ 2-isopropyl-4-methylnicotinonitrile (Molecular Weight: 160.22, Compound 35)

1. H₂SO₄
2. NaOCl

→ Aniline (Compound 2A) 2-isopropyl-4-methylpyridin-3-amine (Molecular Weight: 150.23)

In particular, the synthesis of compound 2A depicted in Scheme A1 uses an isoprenyl boronic ester in Step 1 and precious metal palladium catalysts in Steps 1 and 2, all of which are high-cost materials resulting in a higher cost to manufacture compound 2A. Further, Step 1 in Scheme A1 uses dimethoxyethane as a reaction solvent and dichloromethane as a solvent in the workup of Step 1. Moreover, the hydrogenation reaction in Step 2 of Scheme A1 requires specialized equipment capable of operating at high pressures for the hydrogenation reaction. Similarly, the synthesis of compound 2A depicted in Scheme A2 of PCT Publication No. WO 2021/097207 uses dichloromethane in the extractive work-ups in multiple steps (steps 1 and 2). Moreover, Step 2 of Scheme A2 uses DMF-DMA—a suspected reproductive hazard—to facilitate the methylation reaction, and step 3 of Scheme A2 uses corrosive sulfuric acid (85%) for the functional group interconversion in step 3. In addition, the synthesis of compound 2A depicted in Scheme A3 uses an expensive chiral catalyst and is not amenable for large scale. Moreover, many of the products in Scheme A3 are purified using chromatography and/or work-up steps using halogenated solvents (e.g., dicholoromethane).

The processes disclosed in PCT Publication No. WO 2021/097207 are characterized by the use of high-cost reagents (e.g., isopropenyl boronic ester and palladium catalysts); hazardous solvents (e.g., halogenated hydrocarbon solvents and carcinogenic solvents); chromatographic isolations; aqueous work-ups; corrosive acids (e.g., sulfuric acid); and/or specialized reaction equipment capable to run under high pressures (e.g., hydrogenation). In comparison, the processes disclosed herein provide several advantages, including the following: using inexpensive raw materials without using precious metal catalysts; avoiding use of halogenated or harmful hydrocarbon solvents (i.e., dichloromethane or dimethoxyethane); avoiding aqueous workups and chromatography; using a basic nitrile hydrolysis to form Compound F; and conducted using standard reactor equipment requiring no high-pressure operations. As such, the disclosed processes provide a decreased environmental impact (for example, improved process "greenness") as measured by, for example, a reduction of halogenated solvents. For example, in some embodiments, the disclosed processes comprise the following steps to provide Compound G or a salt thereof:

Compound A-G

Compound B + crotonaldehyde — catalytic reagent, solvent →

Compound A — acid or base, heat → Compound F — [O], OH⁻ →

Compound G

As described herein, Compound A refers to 4-methyl-2-propan-2-yl-pyridine-3-carbonitrile of formula (A)

and salts thereof. As used herein Compound A may also be referred to using 2-isopropyl-4-methylnicotinonitrile or "4-Me-nicotinonitrile" or "nicotinonitrile".

As described herein, Compound B refers to 3-amino-4-methylpent-2-enenitrile ("enaminonitrile") of formula

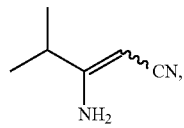

(B)

and salts thereof. As is understood, Compound B can exist as a mixture of (Z/E) stereoisomers having the following formula

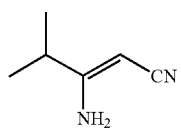

(Z)-Compound B

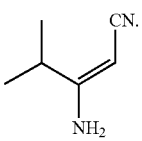

(E)-Compound B

As used herein, "Compound B" and its various representations herein are used interchangeably to refer to an (Z/E) mixture unless otherwise specified. In some embodiments, Compound B has an (Z/E) ratio of 3:1.

Compound B can be prepared using any suitable process. An illustrative synthesis of Compound B is described in Monatshefte fuer Chemie (1999), 130 (3), 441-450. For example, in some embodiments, Compound B is preparedly prepared by the n-butyllithium-mediated heterodimerization of two different nitriles under cryogenic conditions, and purified by the Kugelrohr vacuum distillation as a stereoisomeric mixture (Z/E ratio of 3:1).

As described herein, crotonaldehyde refers to a compound of the formula

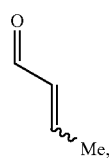

also known as crotonic aldehyde, β-methyl acrolein, 2-butenal, or propylene aldehyde, or herein "enal". As understood, crotonaldehyde can exists as a mixture of (E/2) stereoisomers (e.g., (2E)-but-2-enal). As used herein, "crotonaldehyde" and its various representations herein are used interchangeably to refer to an (E/Z) mixture unless otherwise specified.

Compound C refers to 2-isopropyl-6-methylnicotinonitrile ("6-Me-nicotinonitrile") of formula

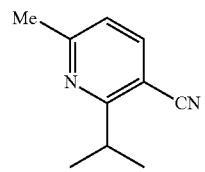

(C)

and salts thereof. Without wishing to be bound to any particular theory, it is understood that Compound C is a regioisomer of Compound A formed by certain processes described herein.

Compound D refers to a compound of formula

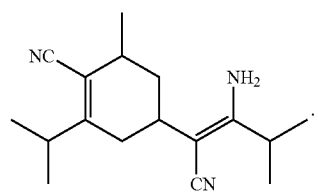

(D)

Without wishing to be bound to any particular theory, it is believed that Compound D is formed (reversibly) as a kinetic reaction intermediate during the disclosed processes for preparing Compound A. Compound D has a molecular weight (m/z) of 273 $[M+H]^+$.

Compound E refers to a compound of formula

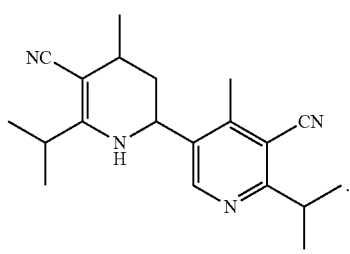

(E)

Without wishing to be bound to any particular theory, it is believed that Compound D is formed as a side product in the disclosed processes for preparing Compound A. Compound E has a molecular weight (m/z) of 323 $[M+H]^+$.

Compound F refers to 2-isopropyl-4-methylnicotinamide ("nicotinamide") of the formula

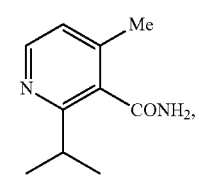

(F)

and salts thereof.

Compound G refers to 2-isopropyl-4-methylpyridin-3-amine ("aniline") of the formula

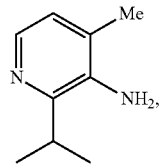
(G)

salts thereof, and hydrates thereof. In some embodiments, the disclosed processes provide a hydrate (e.g., hemihydrate) of Compound G.

The compounds disclosed herein can be used as a salt. As used herein, "salt" includes, for example, an acid addition salt. Salt includes an inorganic or organic acid addition salt. Nonlimiting illustrative acid addition salts include, for example, salts with inorganic acids (e.g., hydrochloride, phosphate, diphosphate, hydrobromide, sulfate, sulfonate, nitrate) and organic acids (e.g., malate, maleate, fumarate, tartrate, succinate, citrate, acetate, lactate, methansulfonoate, p-toluenesulfonate, 2-hydroxyethylsulfonate, benzoate, salicylate, stearate, alkanoates such as acetate, trifluoroacetate, and HOOC—$(CH_2)_n$—COOH, wherein n is 0-4.

As used herein, the term hydrate refers to the chemical entity formed by the interaction of water and a compound, including, for example, hemi-hydrates, monohydrate, dihydrates, trihydrates, etc. The term "monohydrate" means a compound or salt thereof having about one associated water molecule. Those skilled in the art appreciate that the exact number of the associated water molecules may vary slightly at any time with variable temperature, pressure, and other environmental influence. All slight variations of the number of the associated water molecules are contemplated to be within the scope of the present disclosure. The term "dihydrate" means a compound or salt thereof having about two associated water molecules. Those skilled in the art appreciate that the exact number of the associated water molecules may vary slightly at any time with variable temperature, pressure, and other environmental influence. All slight variations of the number of the associated water molecules are contemplated to be within the scope of the present disclosure.

Catalytic Reagent

The processes disclosed herein comprise using a catalytic reagent. The catalytic reagent comprises any suitable catalyst capable of catalyzing the reaction of Compound B or a salt thereof and crotonaldehyde to form Compound A. In some embodiments, the catalytic reagent comprises an acid catalyst, an organocatalyst, or a combination thereof. In some embodiments, the catalytic reagent comprises an acid catalyst. In some embodiments, the catalytic reagent comprises an organocatalyst. As described herein, the catalytic reagent comprises a suitable amount of the acid catalyst and/or organocatalyst.

Acid Catalysts

In some embodiments, the disclosed processes comprise admixing Compound B or a salt thereof and crotonaldehyde in the presence of an acid catalyst. In some embodiments, the acid catalyst comprises a Bronsted-Lowry acid. Suitable nonlimiting examples of Bronsted-Lowry acids include, for example, anhydrous hydrochloric acid, benzoic acid, sulfonic acids (e.g., methanesulfonic acid (MsOH) and trifluromethanesulfonic acid (triflic acid, TfOH)), and a combination thereof.

In some embodiments, the acid catalyst comprises a Lewis acid. Suitable nonlimiting examples of Lewis acid include, for example, a metal halide, a triflate (trifluoromethanesulfonate, $CF_3SO_3^-$, OTf⁻), a boron-containing compound (e.g., a boron etherate, $BF_3SMe_2$, $BF_3NEt$, $BCl_3$, $BBr_3$), and a combination thereof.

As used herein "halide" refers to bromide, chloride, iodide, and fluoride.

Illustrative suitable metal halides include, for example, aluminum (III) chloride ($AlCl_3$), copper (II) chloride ($CuCl_2$), iron (III) chloride ($FeCl_3$), and zinc (II) bromide ($ZnBr_2$). In some embodiments, the metal halide is iron (III) chloride ($FeCl_3$) or any hydrates thereof (e.g., monohydrate, dihydrate, trihydrate, tetrahydrate, pentahydrate, hexahydrate, etc.). In some embodiments, the metal halide is iron (III) chloride. In some embodiments, the metal halide is iron (III) chloride hexahydrate.

Illustrative suitable triflates include, for example, metal triflates and silyl triflates. In some embodiments, the triflate is selected from the group consisting of TMSOTf, $Al(OTf)_3$, $Bi(OTf)_3$, $Cu(OTf)_2$, $Sc(OTf)_3$, $In(OTf)_3$, $La(OTf)_3$, $Yb(OTf)_3$, $Zn(OTf)_2$, and a combination thereof. Illustrative silyl triflates include trimethylsilyl triflate (TMSOTf), tert-butyldimethylsilyl triflate (TBSOTf), and triisopropylsilyl triflate (TIPSOTf).

Illustrative suitable boron-containing compounds include, for example, $BF_3SMe_2$, $BF_3NEt$, $BCl_3$, $BBr_3BF_3·2CH_3COOH$, $BF_3·2H_2O$, and $BF_3·nPrOH$.

Illustrative suitable boron etherates include, for example, boron trifluoro etherate ($BF_3Et_2O$), $BF_3THF$, and $BF_3OMe_2$.

The acid catalyst is present in any suitable amount. If the amount of acid catalyst present is too little, then the process may not proceed at a suitable reaction rate or efficiency. In contrast, if the amount of acid catalyst present is too much, then the process may not be cost effective or may lead to higher amounts of undesirable side products. In some embodiments, the acid catalyst is present in 5 mol % or more based upon Compound B (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol % or more based upon Compound B). Alternatively, or in addition, in some embodiments, the acid catalyst is present in 100 mol % or less based upon Compound B (e.g., 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, or 51 mol % or less based upon Compound B). Thus, the acid catalyst can be present in an amount bounded by, and including, any of the aforementioned values (e.g., 5-100, 6-99, 7-98, 8-97, 9-96, 10-95, 11-94, 12-93, 13-92, 14-91, 15-90, 5-50, 5-40, 5-30, 5-20 mol % based upon Compound B, and the like). In some embodiments, the acid catalyst is present in an amount of 5 to 75 mol %, based upon Compound B. In some embodiments, the acid catalyst is present in an amount of 5 to 50 mol %, based upon Compound B. In some embodiments, the acid catalyst is present in an amount of 5 to 20 mol %, based upon Compound B. In some embodiments, the acid catalyst is present in 10 mol % based upon Compound B.

Organocatalysts

In some embodiments, in conjunction with other above and below embodiments, the catalytic reagent comprises an organocatalyst. In some embodiments, the organocatalyst comprises an amine or a salt thereof. In some embodiments, amine comprises an amino acid (e.g., proline or β-alanine) or a salt thereof. In some embodiments, the amine or salt thereof is a secondary amine or a salt thereof. In some embodiments, the secondary amine or salt thereof is selected from the group consisting of a dialkylamine, a heterocyclic amine, and a combination thereof. The term "dialkylamine" as used herein means an amine substituted with two alkyl groups, for example, a compound of formula NHR'R", wherein each of R' and R" are independently an alkyl group as described herein. The term "heterocyclic amine", refers to a monocyclic or polycyclic ring (saturated, partially saturated, or unsaturated) comprising 3 to 10 (e.g., 3, 4, 5, 6, 7, 8, 9, or 10) members of which 1 to 4 (e.g., 1, 2, 3, or 4) ring atoms are heteroatoms selected from N, O, and S, wherein at least one heteroatom is a basic N.

The term "alkyl" as used herein means a saturated straight or branched chain hydrocarbon. In some embodiments, the alkyl group is a $C_1$-$C_6$ alkyl group. Examples of $C_1$-$C_6$ alkyl groups include but are not limited to methyl, ethyl, isopropyl, n-propyl, isobutyl, n-butyl, sec-butyl, tert-butyl, isopentyl, n-pentyl, neopentyl, sec-pentyl, 3-pentyl, sec-isopentyl, active pentyl, isohexyl, n-hexyl, sec-hexyl, neohexyl, and tert-hexyl.

In some embodiments, the secondary amine comprises a chiral amine. In some embodiments, the secondary amine comprises an achiral amine.

In some embodiments, the amine is β-alanine or a salt thereof. In some embodiments, the amine is a secondary amine or salt thereof is selected from the group consisting of benzylmethylamine, diisopropylamine, D,L-proline, L-proline, prolinol, morpholine, piperidine, pyrrolidine, and a combination thereof.

In some embodiments, the organocatalyst comprises pyrrolidine or a salt thereof. Illustrative pyrrolidine salts include, for example, pyrrolidine hydrochloride, pyrrolidine hexafluorophosphate, pyrrolidine benzoate, pyrrolidine mesylate, pyrrolidine fluoroborate, pyrrolidine hydrochloride, pyrrolidine trifluoroacetate, pyrrolidine acetate, and a combination thereof. In some embodiments, the organocatalyst comprises pyrrolidine hydrochloride.

In some embodiments, the organocatalyst is selected from the group consisting of:

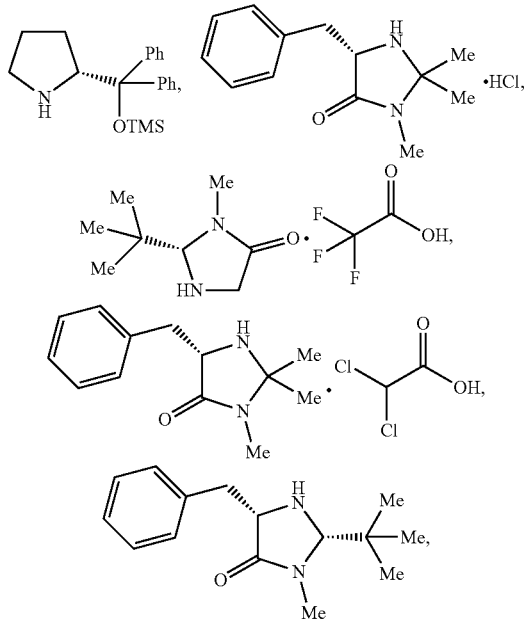

and a combination thereof.

In some embodiments, the organocatalyst is selected from the group consisting of:

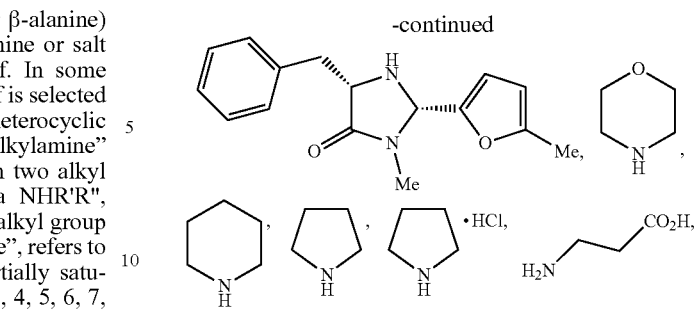

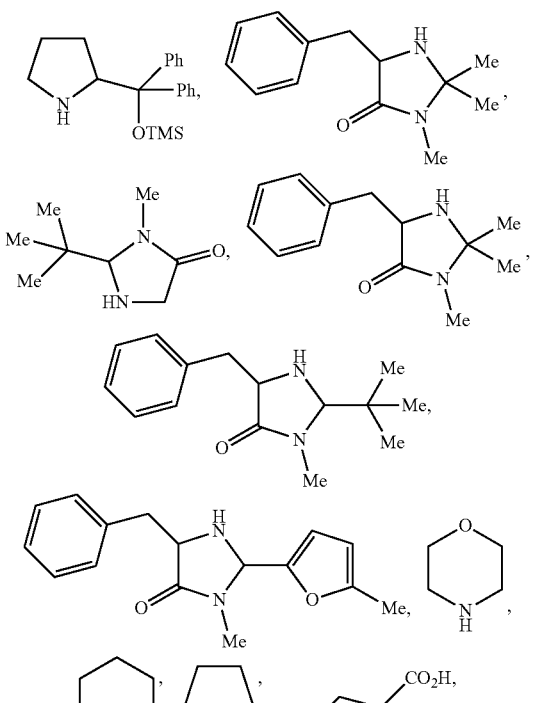

and a combination thereof.

In some embodiments, the organocatalyst is selected from the group consisting of:

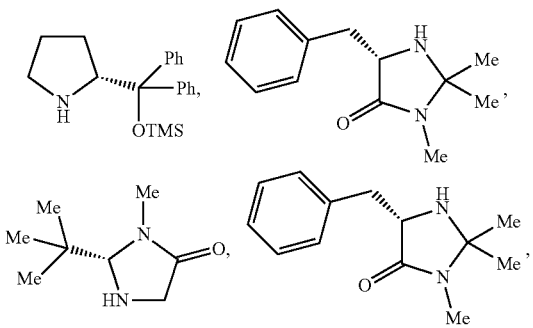

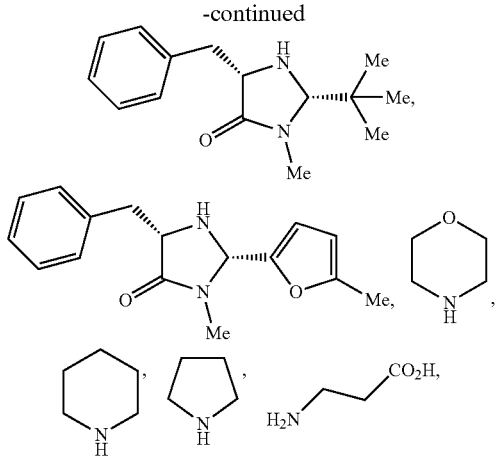

and a combination thereof.

The organocatalyst, when present, is present in any suitable amount. If the amount of organocatalyst present is too little, then the process may not proceed at a suitable reaction rate or efficiency. In contrast, if the amount of organocatalyst present is too much, then the process may not be cost effective or may lead to higher amounts of undesirable side products. In some embodiments, the organocatalyst is present in 5 mol % or more based upon Compound B (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol % or more based upon Compound B). Alternatively, or in addition, in some embodiments, the organocatalyst is present in 200 mol % or less based upon Compound B (e.g., 200, 199, 198, 197, 196, 195, 194, 193, 192, 191, 190, 189, 188, 187, 186, 185, 184, 183, 182, 181, 180, 179, 178, 177, 176, 175, 174, 173, 172, 171, 170, 169, 168, 167, 166, 165, 164, 163, 162, 161, 160, 159, 158, 157, 156, 155, 154, 153, 152, 151, 150, 149, 148, 147, 146, 145, 144, 143, 142, 141, 140, 139, 138, 137, 136, 135, 134, 133, 132, 131, 130, 129, 128, 127, 126, 125, 124, 123, 122, 121, 120, 119, 118, 117, 116, 115, 114, 113, 112, 111, 110, 109, 108, 107, 106, 105, 104, 103, 102, or 101 mol % or less based upon Compound B). Thus, the organocatalyst can be present in an amount bounded by, and including, any of the aforementioned values (e.g., 5-200, 10-200, 6-99, 7-98, 8-97, 9-96, 10-95, 11-94, 12-93, 13-92, 14-91, 15-90, 5-50, 5-40, 5-30, 5-20, 10-50, 10-40, 10-30, or 10-20 mol % based upon Compound B, and the like). In some embodiments, the organocatalyst is present in an amount of 5 to 200 mol %, based upon Compound B. In some embodiments, the organocatalyst is present in an amount of 5 to 150 mol %, based upon Compound B. In some embodiments, the organocatalyst is present in an amount of 5 to 100 mol %, based upon Compound B. In some embodiments, the organocatalyst is present in an amount of 5 to 75 mol %, based upon Compound B. In some embodiments, the organocatalyst is present in an amount of 5 to 50 mol %, based upon Compound B. In some embodiments, the organocatalyst is present in an amount of 5 mol % based upon Compound B. In some embodiments, the organocatalyst is present in an amount of 10 mol % based upon Compound B. In some embodiments, the organocatalyst is present in an amount of 50 mol % based upon Compound B.

Solvents

The disclosed processes are conducted in a suitable solvent. In some embodiments, the solvent comprises a polar aprotic solvent, for example, acetone, acetonitrile, dichloromethane, dimethylformamide (DMF), dimethylpropleneurea, dimethylsulfoxide (DMSO), ethyl acetate, hexamethylphosphoric triamide, or tetrahydrofuran (THF). In some embodiments, the solvent comprises a polar protic solvent, for example, formic acid, n-butanol, isopropanol, nitromethane, ethanol, methanol, acetic acid, or water. In some embodiments, the solvent comprises a polar aprotic solvent, a polar protic solvent, or a combination thereof. In some embodiments, in conjunction with other above and below embodiments, the solvent is selected from the group consisting of water, methanol, ethanol, isopropanol, acetic acid, acetonitrile, acetone, cyclopentyl methyl ether, ethyl acetate, methyl isobutyl ketone, isopropyl acetate, tetrahydrofuran, methyl tert-butyl ether, N-methylpyrrolidone, dimethylsulfoxide, dimethylformamide, toluene, n-heptane, and a combination thereof. In some embodiments, the solvent is selected from the group consisting of water, methanol, ethanol, isopropanol, acetic acid, acetonitrile, dimethyformamide, N-methylpyrrolidone, dimethylsulfoxide, and a combination thereof. In some embodiments, the solvent is selected from the group consisting of cyclopentyl methyl ether, ethyl acetate, acetonitrile, tetrahydrofuran, and a combination thereof. In some embodiments, the solvent comprises acetonitrile.

The solvent is present in a suitable amount. If the amount of solvent present is too little then the reactants may not mix in a suitable manner to facilitate the reaction or processing of the reaction mixture. In contrast, if the amount of solvent is too high, then the concentration of the reactants may be too dilute for suitable reaction or the processing of the reaction may be unnecessarily cumbersome or have high energy requirements to remove solvent.

By way of example, in the disclosed processes for Compound A the solvent is present in an amount of 5 volumes to 40 volumes (L/kg) based upon Compound B (e.g., 10 to 35 volumes, 15 to 30 volumes, or 20 to 25 volumes of solvent based upon Compound B. As used herein "volume" refers to liter of solvent per kilogram of Compound B. In some embodiments, the solvent is present in an amount of 10 volumes (L/kg) based upon Compound B.

Temperature

The disclosed processes for preparing Compound A or salt thereof are conducted at a suitable temperature. If the temperature is too low, the reaction may not proceed at a sufficient rate. In contrast, if the temperature too high, then the reaction may not be stable or result in higher amounts of undesirable side products. In some embodiments, the disclosed processes are conducted at a temperature of 0° C. or more (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75° C. or more). Alternatively, or in addition the disclosed processes are conducted at a temperature of 150° C. or less (e.g., 150, 149, 148, 147, 146, 145, 144, 143, 142, 141, 140, 139, 138, 137, 136, 135, 134, 133, 132, 131, 130, 129, 128, 127, 126, 125, 124, 123, 122, 121, 120, 119, 118, 117, 116, 115, 114, 113, 112, 111, 110, 109, 108, 107, 106, 105, 104, 103, 102, 101, 100, 99, 98, 97, 96, 95, 94, 93, 92, 91, 90, 89, 88, 87, 86, 85, 84, 83, 82, 81, 80, 79, 78, 77, or 76° C. or less). Thus, the disclosed processes can be conducted at any temperature bounded by, and including, any of the aforementioned values (e.g., 0-150, 1-149, 2-148, 3-147, 4-146, 5-145, 6-144, 7-143, 8-142, 9-141, 10-140° C., and the like. In some embodiments, the admixing of Compound B and crotonaldehyde is conducted at a temperature of from 0-150° C. (e.g., 20-110° C., 40-80° C., or 50-70° C.). In some embodiments, the admixing of Compound B and crotonaldehyde is conducted at 60° C.

Stoichiometry

The disclosed processes for preparing Compound A or a salt thereof comprising admixing Compound B or a salt thereof with a suitable amount of crotonaldehyde. In some embodiments, crotonaldehyde is present in molar excess, relative to Compound B. In some embodiments, crotonaldehyde is present in an amount of 1.1 to 5 molar equivalents, relative to Compound B (e.g., 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 molar equivalents relative to Compound B). In some embodiments, crotonaldehyde is present in 1.1 to 5 molar equivalents relative to Compound B. In some embodiments, crotonaldehyde is present in 1.5 to 2.5 molar equivalents relative to Compound B. In some embodiments, crotonaldehyde is present in 2 molar equivalents relative to Compound B.

Yield

The disclosed processes provide Compound A or a salt thereof in a suitable yield. In some embodiments, the yield of Compound A or a salt thereof is 10% to 90%, based upon Compound B (e.g., 15 to 90%, 20 to 90%, 25 to 90%, 30 to 90%, 35 to 90%, 40 to 90%, 45 to 90%, 50 to 90%, 55 to 95%, 60 to 95%, 65 to 95%, 70 to 95%, 75 to 95%, 80 to 95%, or 90 to 95% yield based upon Compound B. In some embodiments, the yield of Compound A is 50 to 75% (e.g., 50, 51, 52, 53, 54, 55, 56, 57, 58, 59, 60, 61, 62, 63, 64, 65, 66, 67, 68, 69, 70, 71, 72, 73, 74, or 75%), based upon Compound B. In some embodiments, the yield of Compound A is 55 to 65%. In some embodiments, the yield of Compound A is at least 50% (e.g., at least 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95%). In some embodiments, Compound A is obtained in 68 to 75% assay yield (e.g., HPLC) and in 40 to 53% isolated yield (e.g., column chromatography). In some embodiments, the purity of Compound A is at least 60% (e.g., at least 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99%) by HPLC.

Compound A can be isolated in any suitable form or technique. In some embodiments, Compound A is isolated as a crystalline salt or free base. In some embodiments, Compound A is isolated as a free base. In some embodiments, Compound A is isolated using polish filtration and/or distillation (e.g., vacuum distillation).

Use of Compound A in Preparation of Compound F, G, and Sotorasib

In some embodiments, in conjunction with other above and below embodiments, the disclosed processes further comprise converting Compound A or a salt thereof into other compounds useful for preparing sotorasib (e.g., Compound F or a salt thereof, or Compound G or a salt thereof).

In some embodiments, in conjunction with other above or below embodiments, the disclosed processes for preparing Compound A or a salt thereof comprise converting Compound A or a salt thereof to Compound F or Compound G in a single reaction vessel such that reaction conditions, as discussed below, e.g., the heating of Compound A or salt thereof or the admixing of Compound F or salt thereof with an oxidizing agent and base, are performed without isolating Compound F or a salt thereof.

Compound F:

Compound A or a salt thereof can be converted to Compound F or a salt thereof under any suitable conditions. In some embodiments, the disclosed processes for preparing Compound A or a salt thereof further comprise heating Compound A or a salt thereof to a temperature of at least 30° C. in the presence of an acid or a base to form Compound F or a salt thereof. In some embodiments, the disclosed processes result in the formation of Compound F as a free base.

In embodiments comprising converting Compound A to Compound F, Compound A or a salt thereof can be heated to a temperature of 65° C. or more (e.g., 65, 66, 67, 68, 69, 70, 71, 72, 73, 74, 75, 76, 77, 78, 79, 80, 81, 82, 83, 84, or 85° C. or more). Alternatively, or in addition, Compound A or a salt thereof can be heated to a temperature of 105° C. or less (e.g., 105, 104, 103, 102, 101, 100, 99, 98, 97, 96, 95, 94, 93, 92, 91, 90, 89, 88, 87, or 86° C. or less). Thus, Compound A can be heated to any temperature bounded by, and including, the aforementioned values (e.g., 65-105° C., 66-104° C., 67-103° C., 68-102° C., 69-101° C., 70-100° C., 90-100° C., 90-95° C., and the like. In some embodiments, Compound A or a salt thereof is heated to a temperature of is 90° C. in embodiments comprising converting Compound A to Compound F. In some embodiments, Compound A or a salt thereof is heated to a temperature of is 92° C. in embodiments comprising converting Compound A to Compound F. In some embodiments, Compound A or a salt thereof is heated to a temperature of is 100° C. in embodiments comprising converting Compound A to Compound F.

In some embodiments, when Compound A is heated in the presence of an acid, the acid is selected from the group consisting of sulfuric acid, hydrochloric acid, phosphoric acid, and a combination thereof. In some embodiments, the acid comprises sulfuric acid.

In some embodiments, when Compound A is heated in the presence of a base. In some embodiments, the base comprises a metal hydroxide. Illustrative suitable metal hydroxides include, for example, sodium hydroxide, potassium hydroxide, cesium hydroxide, lithium hydroxide, and a combination thereof. In some embodiments, the metal hydroxide is sodium hydroxide.

Compound G:

In some embodiments, the disclosed processes further comprise converting Compound F or a salt thereof to Compound G or a salt thereof. In some embodiments, the disclosed processes further comprise converting Compound F or a salt thereof to Compound G. In these embodiments, Compound G or a salt thereof is prepared by admixing Compound F or a salt thereof with an oxidizing agent and a base to form Compound G or a salt thereof.

In some embodiments, the oxidizing agent is selected from the group consisting of sodium hypochlorite, sodium hypobromide, N-bromosuccinimide, lead tetraacetate, and a combination thereof. In some embodiments, the oxidizing agent comprises sodium hypochlorite.

In some embodiments, the base is selected from the group consisting of sodium hydroxide, potassium hydroxide, 1,8-diazabicyclo[5.4.0]undec-7-ene, and a combination thereof. In some embodiments, the base comprises sodium hydroxide.

In some embodiments, Compound G or a salt thereof produced from the disclosed processes is crystalline. Without wishing to be bound to any particular theory, it is believed that Compound G or a salt thereof produced from the processes disclosed herein can exist in various crystalline forms (e.g., Form 1 and Form 2).

Crystalline forms of Compound G can be analyzed using any suitable technique. For example, in some embodiments, the crystalline form of Compound G is evaluated using one or more of the following techniques: differential scanning calorimetry (DSC), thermal gravimetric analysis (TGA), X-ray powder diffraction, single crystal X-ray diffraction (SCXRD), and/or Karl Fischer titration.

In some embodiments, Compound G or a salt thereof comprises crystalline Compound G anhydrous Form 1. In some embodiments, Compound G anhydrous Form 1 is characterized by a X-ray powder diffraction (XRPD, CuKα radiation (1.54 Å) pattern comprising peaks (±0.2° 2θ) at 7.17, 8.59, 11.44, 12.76, 13.62, 14.17, 15.34, 17.69, 20.25, 24.05, 24.34, 25.56, 29.85, 30.12, 31.38, and 34.37. In some embodiments, Compound G anhydrous Form 1 is characterized by a (XRPD, CuKα radiation (1.54 Å) pattern comprising peaks (±0.2° 2θ) at 7.17, 8.57, 12.74, 13.61, 21.53, 24.35, 29.85, and 34.99. In some embodiments, Compound G anhydrous Form 1 is characterized by a crystalline structure having the following properties when measured at 100 degrees Kelvin (i.e., −173° C.):

| Crystal system | Monoclinic |
|---|---|
| Space group | $P2_1/n$ |
| Unit cell dimensions | a = 13.03402 (19) Å |
| | b = 8.22157 (10) Å |
| | c = 24.9338 (10) Å |
| | $\alpha = \gamma = 90°, \beta = 101.6656°$ |
| Unit cell volume (Å$^3$) | 2616.72 |
| Z | 12 |
| Z' | 3 |
| Density (g/cm$^3$) | 1.114 |
| R % | 5.29% |

In some embodiments, Compound G is characterized by a unit cell having the following unit cell dimensions when measured at −173° C.: a=13.0 Å; b=8.2 Å; c=24.9 Å; α=90°; γ=90°; and β=101.7°.

In some embodiments, Compound G anhydrous Form 1 is characterized by a crystalline structure having the following properties when measure at room temperature (i.e., 23° C.):

| Unit cell dimensions | a = 13.904 (6) Å |
|---|---|
| | b = 8.411 (3) Å |
| | c = 25.397 (10) Å |
| | $\alpha = \gamma = 90°, \beta = 103.13 (4)°$ |
| Unit cell volume (Å$^3$) | 2724 (2) |

In some embodiments, Compound G is characterized by a unit cell having the following unit cell dimensions when measured at 23° C.: a=13.9 Å; b=8.4 Å; c=25.4 Å; α=90°; γ=90°; and β=103.1°.
Form 2

In some embodiments, Compound G or a salt thereof comprises crystalline Compound G hemihydrate Form 2. In some embodiments, Compound G hemihydrate Form 2 is characterized by a X-ray powder diffraction (XRPD, CuKα radiation (1.54 Å) pattern comprising peaks (±0.2° 2θ) at 10.82, 11.76, 14.07, 15.26, 16.02, 17.78, 20.79, 21.73, 22.27, 23.62, 24.78, 26.03, 29.2 30.04, 31.09, 32.22, 36.76, 40.39 and 41.44. In some embodiments, Compound G hemihydrate Form 2 is characterized by a X-ray powder diffraction (XRPD, CuKα radiation (1.54 Å)) pattern comprising peaks (±0.2° 2θ) at 10.82, 21.73, 30.04, 32.22 and 40.39. In some embodiments, Compound G hemihydrate Form 2 is characterized by a crystalline structure having the following properties when measured at 100 degrees Kelvin (i.e., −173° C.):

| Crystal system | orthorhombic |
|---|---|
| Space group | $P2_12_12_1$ |
| Unit cell dimensions | a = 11.5202 (2) Å |
| | b = 9.7734 (10) Å |
| | c = 8.0610 (10) Å |
| | $\alpha = \beta = \gamma = 90°$ |
| Unit cell volume (Å$^3$) | 907.60 (2) |
| Z | 4 |
| Z' | 1 |
| Density (g/cm$^3$) | 1.165 |
| R % | 3.45% |

In some embodiments, Compound G is characterized by a unit cell having the following unit cell dimensions when measured at −173° C.: a=11.5 Å; b=9.8 Å; c=8.1 Å; α=90°; γ=90°; and β=90°.

In some embodiments, Compound G hemihydrate Form 2 is characterized by a crystalline structure having the following properties when measured at room temperature (i.e., 23° C.):

| Unit cell dimensions | a = 8.179 (3) Å |
|---|---|
| | b = 9.935 (3) Å |
| | c = 11.601 (4) Å |
| | $\alpha = \beta = \gamma = 90°$ |
| Unit cell volume (Å$^3$) | 942.7 (6) |

In some embodiments, Compound G is characterized by a unit cell having the following unit cell dimensions when measured at 23° C.: a=8.2 Å; b=9.9 Å; c=11.6 Å; α=90°; γ=90°; and β=90°.

It is understood that SCXRD studies can be conducted at 100 K and that XRPD can be conducted at room temperature.
Sotorasib:

In some embodiments, the disclosed processes further comprise using any one of Compound A, Compound F, and Compound G or salt of any of the foregoing that is prepared to form sotorasib, e.g., as discussed in PCT Publication Nos. WO 2021/097207A1 and WO 2018/217651A1, both of which are incorporated herein by reference in their entireties for all purposes.

In some embodiments, the disclosed processes further comprise using any one of Compound A, Compound F, and Compound G or salt of any of the foregoing to form sotorasib or any sotorasib intermediate as described in any synthesis of sotorasib as provided herein.

The following intermediate compounds of sotorasib are representative examples of the disclosure and are not intended to be construed as limiting the scope of the present invention. Compound A, Compound F, and/or Compound G or a salt of any of the foregoing can be used the following synthetic route to provide any intermediate provided below, any collection of intermediates, and/or sotorasib itself.

A synthesis of sotorasib and certain relevant intermediates is described in U.S. Ser. No. 15/984,855, filed May 21, 2018 (U.S. Publication No. 2018/0334454, Nov. 22, 2018) which claims priority to and the benefit claims the benefit of U.S. Provisional Application No. 62/509,629, filed on May 22, 2017, both of which are incorporated herein by reference in their entireties for all purposes. A synthetic route as provided in U.S. Ser. No. 15/984,855 is provided below. As disclosed elsewhere herein, Compound A, Compound F, and/or Compound G or a salt of any of the foregoing can be used and/or implemented into the following synthetic route to provide any intermediate provided therein, any collection of intermediates (e.g., any one or more of intermediate A1, A2, A3, A4, A5, and/or A6) and/or sotorasib itself.

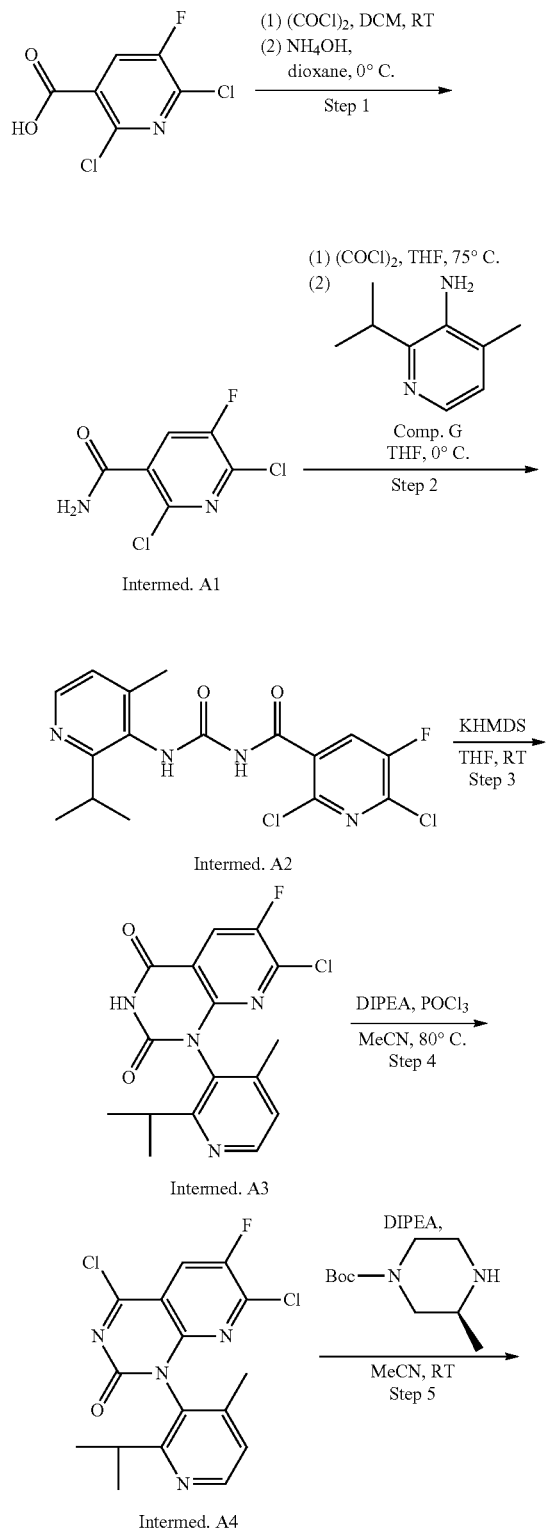

As will be appreciated in view of the disclosure, Compound A, Compound F, and/or Compound G or a salt of any of the foregoing can be used and/or implemented into several embodiments of methods of manufacture to provide any one or more of intermediates A2, A3, A4, A5, A6, sotorasib, and/or combinations thereof. Such methods may include any combination of steps disclosed herein, such as, for example, a method of manufacture (including any reagents required in any step or steps) reciting the following combinations of steps: Compound B→Compound A→Compound G+A1→A2; Compound G+A1→A2→A3; Compound B→Compound A→Compound G+A1→A2→A3-A4→A5→A6; Compound B→Compound A→Compound G+A1→A2→A3→A4→A5→A6→sotorasib; Compound B→Compound A→Compound G+A1→sotorasib; Compound B→Compound A→Compound G+A1→A2→A5→A6→sotorasib; or any other variations of combinations of steps disclosed in the above scheme (e.g., omitting or including any step provided above).

Another synthesis of sotorasib and certain relevant intermediates was described in International Application No.

PCT/US19/61815, filed Nov. 15, 2019 (PCT Publication No. WO2020/102730, May 22, 2020) which claims priority to and the benefit claims the benefit of U.S. provisional patent application 62/768,802 filed Nov. 16, 2018, both of which are incorporated herein by reference in their entireties for all purposes. A synthetic route as provided in International Application No. PCT/US19/61815 is provided below. As disclosed elsewhere herein, Compound A, Compound F, and/or Compound G or a salt of any of the foregoing can be used and/or implemented into the following synthetic route to provide any intermediate provided below, any collection of intermediates (e.g., any one or more of intermediate B3, B4, B5, B6, B7, B8, and/or combinations thereof) and/or sotorasib itself. As will be appreciated, Compound A, Compound F, and/or Compound G or a salt of any of the foregoing can be implemented into a synthetic route with one or more of B1 and/or B2 to provide, for example, B3 or any intermediate provided below, any collection of intermediates (e.g., any one or more of intermediate B3, B4, B5, B6, B7, and/or B8) and/or sotorasib itself.

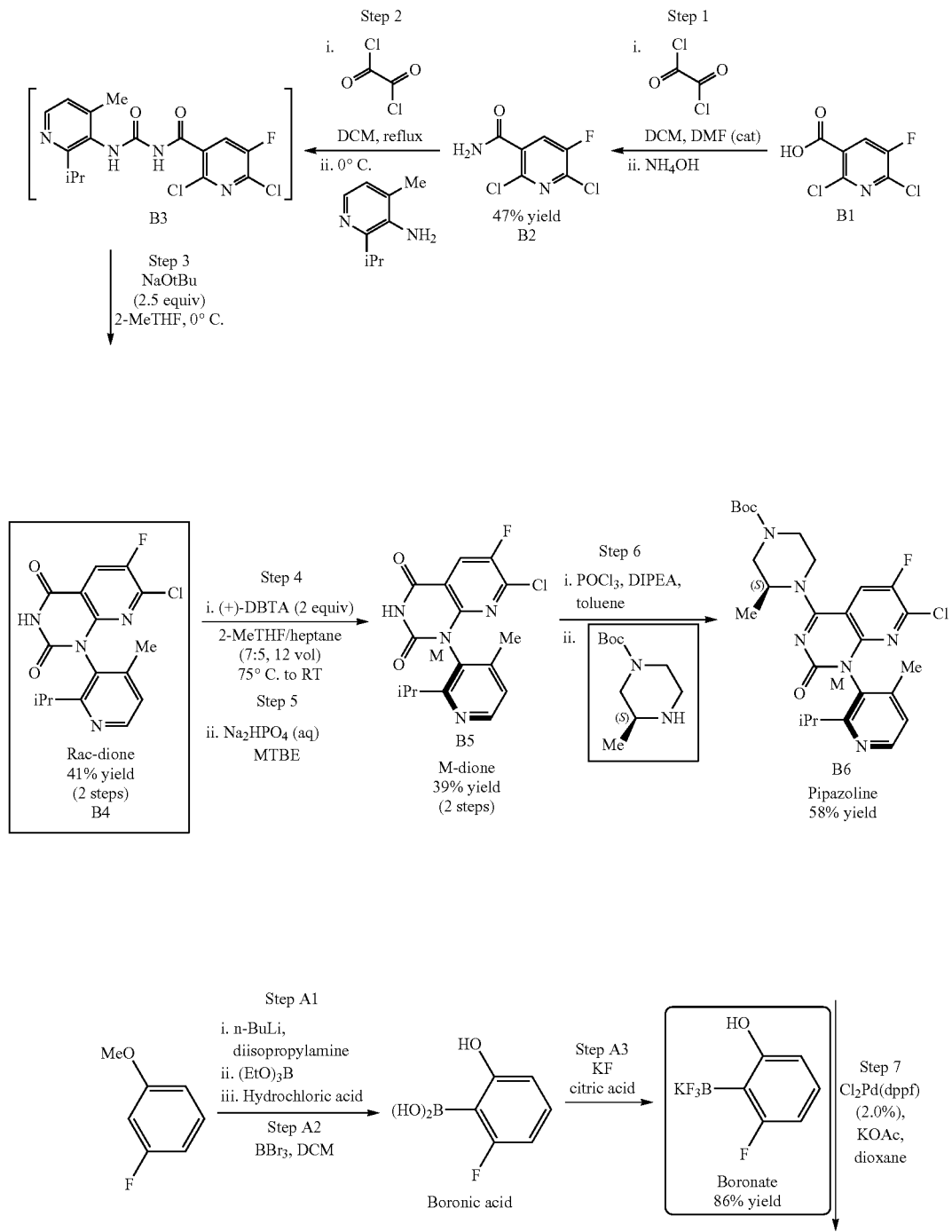

-continued

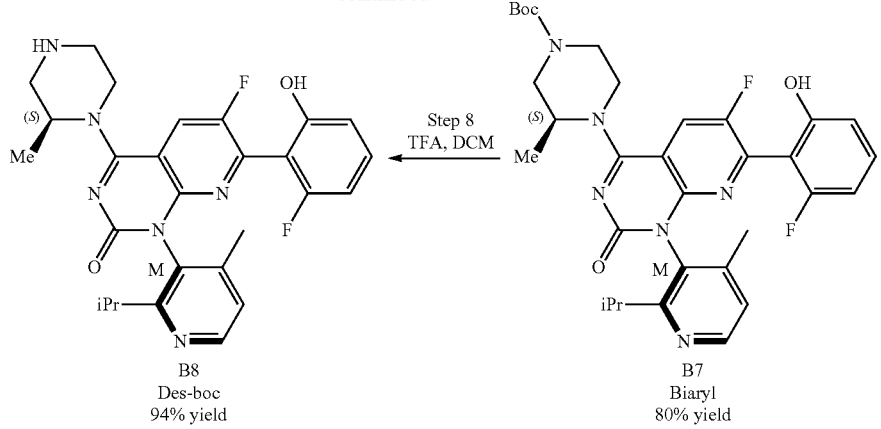

B8
Des-boc
94% yield

B7
Biaryl
80% yield

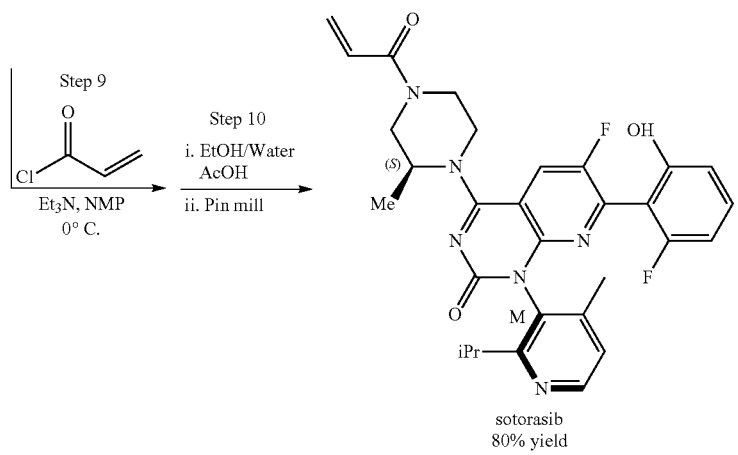

sotorasib
80% yield

As will be appreciated in view of the disclosure, Compound A, Compound F, and/or Compound G or a salt of any of the foregoing can be used and/or implemented into several embodiments of methods of manufacture to provide any one or more of intermediates B3, B4, B5, B6, B7, B8, sotorasib, and/or combinations thereof. Such methods may include any combination of steps disclosed herein, such as, for example, a method of manufacture (including any reagents required in any step or steps) reciting the following combinations of steps: Compound B→Compound A→Compound G+B2→B3; Compound G+B2→B3→B4; Compound B→Compound A→Compound G+B2→B3→B4→B5-B6-B7; Compound B→Compound A→Compound G+B2→B3→B4→B5→B6→B7→B8→sotorasib; Compound B→Compound A→Compound G+B2→sotorasib; Compound B→Compound A→Compound G+B2→B3→B7→B8→sotorasib; or any other variations of combinations of steps disclosed in the above scheme (e.g., omitting or including any step provided above).

Another synthesis of sotorasib and the relevant intermediates was described in International Application No. PCT/US2020/060421, filed Nov. 13, 2020 (PCT Publication No. WO2021/097212, May 20, 2021) which claims priority to and the benefit claims the benefit of U.S. provisional patent application 62/935,502 filed Nov. 14, 2019, both of which are incorporated herein by reference in their entireties for all purposes. A synthetic route as provided in International Application No. PCT/US2020/060421 is provided below. As disclosed elsewhere herein, Compound A, Compound F, and/or Compound G or a salt of any of the foregoing can be used and/or implemented into the following synthetic route to provide any intermediate provided below, any collection of intermediates (e.g., any one or more of intermediate C3, C4, C5, C6, C7, C8, C9, and/or combinations thereof) and/or sotorasib itself. As will be appreciated, Compound A, Compound F, and/or Compound G or a salt of any of the foregoing can be implemented into a synthetic route with one or more of C1 and/or C2 to provide, for example, C3 or any intermediate provided below, any collection of intermediates (e.g., any one or more of intermediate C3, C4, C5, C6, C7, C8, and/or C9) and/or sotorasib itself.

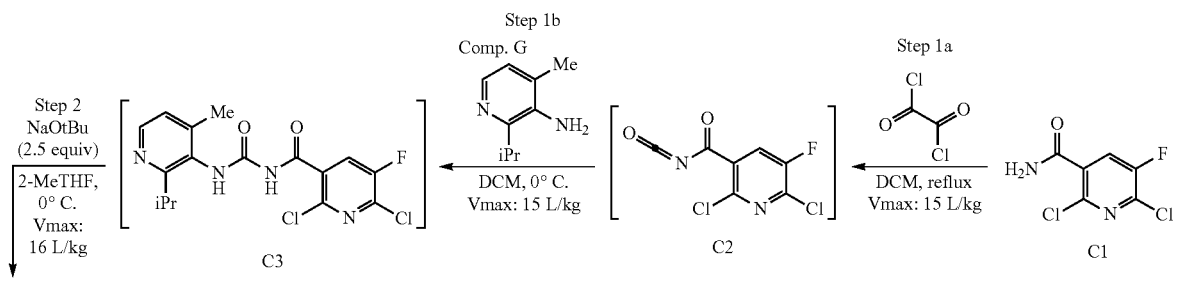
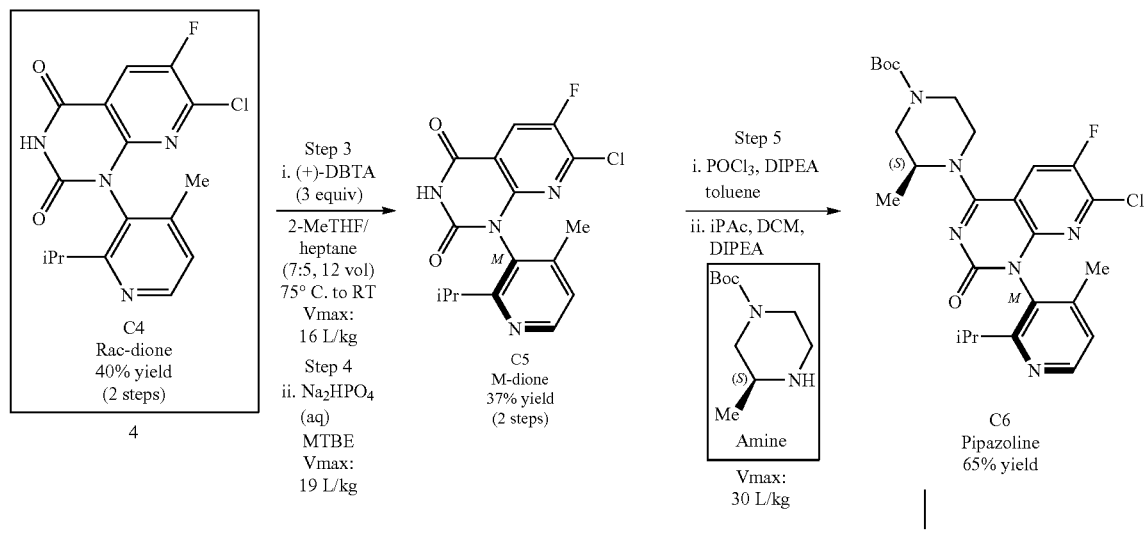
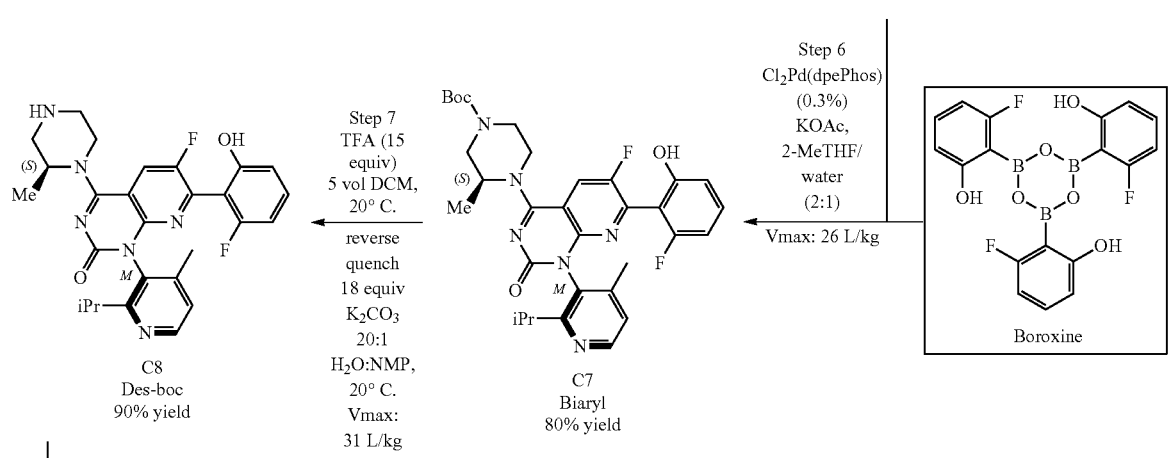

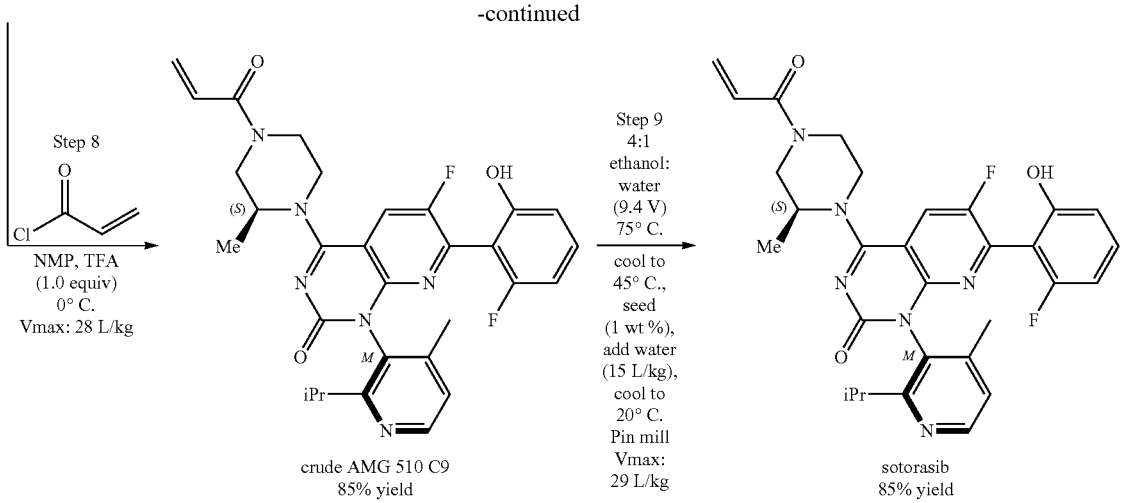

As will be appreciated in view of the disclosure, Compound A, Compound F, and/or Compound G or a salt of any of the foregoing can be used and/or implemented into several embodiments of methods of manufacture to provide any one or more of intermediates C3, C4, C5, C6, C7, C8, C9, sotorasib, and/or combinations thereof. Such methods may include any combination of steps disclosed herein, such as, for example, a method of manufacture (including any reagents required in any step or steps) reciting the following combinations of steps: Compound B→Compound A→Compound G+C2→C3; Compound G+C2→C3→C4; Compound B→Compound A→Compound G+C2→C3→C4→C5→C6-C7; Compound B→Compound A→Compound G+C2→C3-C4→C5-+ C6→C7→C8→C9→sotorasib; Compound B→Compound A→Compound G+C2→sotorasib; Compound B→Compound A→Compound G+C2→C3→C7→C8→sotorasib; Compound A→Compound G+C2-+C3→C9→sotorasib; or any other variations of combinations of steps disclosed in the above scheme (e.g., omitting or including any step provided above).

Another synthesis of sotorasib and the relevant intermediates was described in International Application No. PCT/US2021/060048, filed Nov. 19, 2021 (PCT Publication No. WO2022/109242, May 27, 2022) which claims priority to and the benefit claims the benefit of U.S. provisional patent application 63/116,703, filed Nov. 20, 2020, both of which are incorporated herein by reference in their entireties for all purposes. A synthetic route as provided in International Application No. PCT/US2021/060048 is provided below. As disclosed elsewhere herein, Compound A, Compound F, and/or Compound G or a salt of any of the foregoing can be used and/or implemented into the following synthetic route to provide any intermediate provided below, any collection of intermediates (e.g., D1) and/or sotorasib itself. As will be appreciated, Compound A, Compound F, and/or Compound G or a salt of any of the foregoing can be implemented into a synthetic route as shown below and/or as shown above with one or more of A1, A2, A3, A4, A5, A6, B2, B3, B4, B5, B6, B7, B8, C1, C3, C4, C5, C6, C7, C8, and/or C9 to provide, for example, and/or sotorasib or any other intermediate disclosed herein. As will be appreciated in view of the disclosure, Compound A, Compound F, and/or Compound G or a salt of any of the foregoing can be used and/or implemented into several embodiments of methods of manufacture to provide any one or more of intermediates A1, A2, A3, A4, A5, A6, B2, B3, B4, B5, B6, B7, B8, C1, C3, C4, C5, C6, C7, C8, C9, sotorasib, and/or combinations thereof. Such methods may include any combination of steps disclosed herein (or omit any combination of steps).

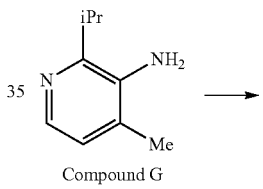

Compound G

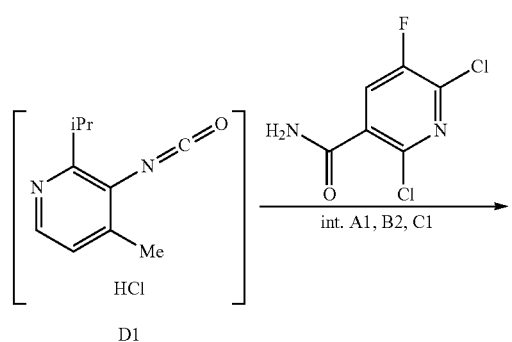

int. A1, B2, C1

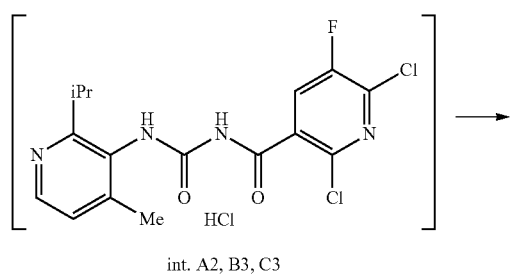

int. A2, B3, C3

-continued

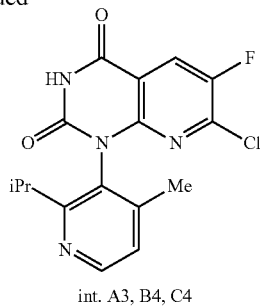

int. A3, B4, C4

As used herein, "intermediate" compounds, include structures produced from the synthetic procedures described, whether isolated or generated in-situ and not isolated, prior to obtaining the finally desired compound. These intermediates are included in the scope of this disclosure. Exemplary embodiments of such intermediate compounds are set forth elsewhere herein.

EMBODIMENTS

1. A process for preparing Compound A or a salt thereof

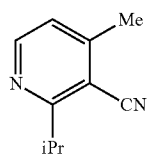

(A)

comprising:
admixing Compound B or a salt thereof and crotonaldehyde in a solvent and in the presence of a catalytic reagent to form Compound A or a salt thereof,
wherein the catalytic reagent comprises an acid catalyst, an organocatalyst, or a combination thereof

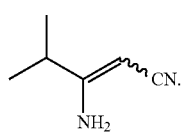

(B)

2. The process of embodiment 1, wherein the acid catalyst comprises a Bronsted-Lowry acid.
3. The process of embodiment 2, wherein the Bronsted-Lowry acid is triflic acid (TfOH).
4. The process of embodiment 1, wherein the acid catalyst comprises a Lewis acid.
5. The process of embodiment 4, wherein the Lewis acid comprises a metal halide, a triflate, a boron etherate, or a combination thereof.
6. The process of embodiment 5, wherein the metal halide is selected from the group consisting of $AlCl_3$, $CuCl_2$, $FeCl_3$, $ZnBr_2$, and a combination thereof.
7. The process of embodiment 6, wherein the metal halide is $FeCl_3$.
8. The process of any one of embodiments 5-7, wherein the triflate is selected from the group consisting of a metal triflate, a silyl triflate, and a combination thereof.

9. The process of embodiment 8, wherein the metal triflate is selected from the group consisting of $Al(OTf)_3$, $Bi(OTf)_3$, $Cu(OTf)_2$, $Sc(OTf)_3$, $In(OTf)_3$, $La(OTf)_3$, $Yb(OTf)_3$, $Zn(OTf)_2$, and a combination thereof.
10. The process of embodiment 8, wherein the triflate is a silyl triflate.
11. The process of embodiment 8 or 10, wherein the silyl triflate is TMSOTf.
12. The process of any one of embodiments 5-11, wherein the boron etherate is $BF_3Et_2O$.
13. The process of any one of embodiments 1-12, wherein the acid catalyst is present in an amount of 5 to 75 mol %, based upon Compound B.
14. The process of any one of embodiments 1-13, wherein the acid catalyst is present in an amount of 5 to 50 mol %, based upon Compound B.
15. The process of any one of embodiments 1-14, wherein the acid catalyst is present in an amount of 5 to 20 mol %, based upon Compound B.
16. The process of any one of embodiments 1-14, wherein the acid catalyst is present in an amount of 50 mol %, based upon Compound B.
17. The process of any one of embodiments 1-16, wherein the organocatalyst comprises an amine or a salt thereof.
18. The process of embodiment 17, wherein the amine comprises an amino acid or a salt thereof.
19. The process of embodiment 17 or 18, wherein the amine comprises a secondary amine or a salt thereof.
20. The process of embodiment 19, wherein the secondary amine or salt thereof is a dialkylamine, a heterocyclic amine, or a combination thereof.
21. The process of embodiment 19 or 20, wherein the secondary amine or salt thereof is selected from the group consisting of benzylmethylamine, diisopropylamine, β-alanine, D,L-proline, L-proline, prolinol, morpholine, piperidine, pyrrolidine, and a combination thereof.
22. The process of any one of embodiments 1-21, wherein the organocatalyst comprises pyrrolidine or a salt thereof.
23. The process of embodiment 22, wherein the pyrrolidine salt is selected from the group consisting of pyrrolidine hexafluorophosphate, pyrrolidine benzoate, pyrrolidine mesylate, pyrrolidine fluoroborate, pyrrolidine hydrochloride, pyrrolidine trifluoroacetate, pyrrolidine acetate, and a combination thereof.
24. The process of any one of embodiments 1-23, wherein the organocatalyst comprises pyrrolidine hydrochloride.
25. The process of any one of embodiments 1-24, wherein the organocatalyst is selected from the group consisting of:

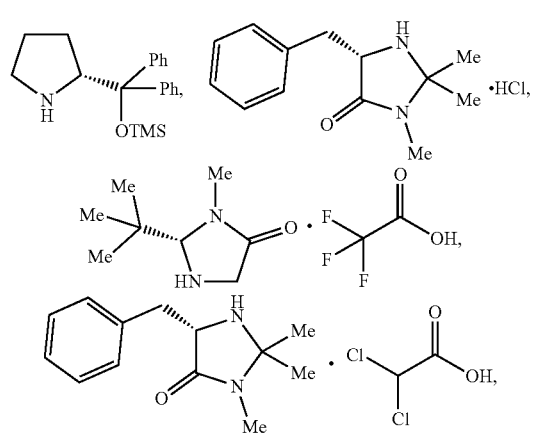

-continued

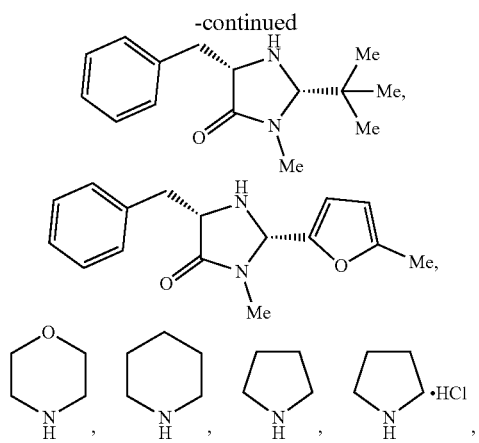

and a combination thereof.

26. The process of any one of embodiments 1-25, wherein the organocatalyst is present in an amount of 5 to 200 mol %, based upon Compound B.

27. The process of any one of embodiments 1-26, wherein the organocatalyst is present in an amount of 5 to 150 mol %, based upon Compound B.

28. The process of any one of embodiments 1-27, wherein the organocatalyst is present in an amount of 5 to 100 mol %, based upon Compound B.

29. The process of any one of embodiments 1-28, wherein the organocatalyst is present in an amount of 5 to 75 mol %, based upon Compound B.

30. The process of any one of embodiments 1-29, wherein the organocatalyst is present in an amount of 5 to 50 mol %, based upon Compound B.

31. The process of any one of embodiments 1-30, wherein the organocatalyst is present in an amount of 10 mol %, based upon Compound B.

32. The process of any one of embodiments 1-31, wherein the solvent comprises a polar aprotic solvent.

33. The process of any one of embodiments 1-31, wherein the solvent is selected from the group consisting of water, methanol, ethanol, isopropanol, acetic acid, acetonitrile, acetone, cyclopentyl methyl ether, ethyl acetate, methyl isobutyl ketone, isopropyl acetate, tetrahydrofuran, methyl tert-butyl ether, N-methylpyrrolidone, dimethylsulfoxide, dimethylformamide, toluene, n-heptane, and a combination thereof.

34. The process of any one of embodiments 1-31, wherein the solvent is selected from the group consisting of water, methanol, ethanol, isopropanol, acetic acid, acetonitrile, dimethyformamide, N-methylpyrrolidone, dimethylsulfoxide, and a combination thereof.

35. The process of any one of embodiments 1-31, wherein the solvent is selected from the group consisting of cyclopentyl methyl ether, ethyl acetate, acetonitrile, tetrahydrofuran, and a combination thereof.

36. The process of any one of embodiments 1-31, wherein the solvent comprises acetonitrile.

37. The process of any one of embodiments 1-36, wherein the solvent is present in an amount of 5 volumes to 40 volumes (L/kg) based upon Compound B.

38. The process of any one of embodiments 1-37, wherein the solvent is present in an amount of 10 volumes (L/kg) based upon Compound B.

39. The process of any one of embodiments 1-38, wherein the admixing is conducted at a temperature of from 0° C. to 150° C.

40. The process of embodiment 39, wherein the temperature is from 20° C. to 110° C.

41. The process of embodiment 39, wherein the temperature is from 40° C. to 80° C.

42. The process of embodiment 39, wherein the temperature is from 50° C. to 70° C.

43. The process of embodiment 39, wherein the temperature is 60° C.

44. The process of any one of embodiments 1-43, wherein crotonaldehyde is present in molar excess, relative to Compound B.

45. The process of any one of embodiments 1-44, wherein crotonaldehyde is present in an amount of 1.1 to 5 molar equivalents, relative to Compound B.

46. The process of any one of embodiments 1-45, wherein crotonaldehyde is present in 2 molar equivalents, relative to Compound B.

47. The process of any one of embodiments 1-46, wherein Compound A is substantially free of Compound D

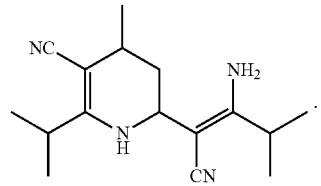 [SMILES: CC(C)C1=C(C#N)C(C)CC(/C(C#N)=C(\N)C(C)C)N1]

48. The process of any one of embodiments 1-47, wherein Compound A is substantially free of Compound E

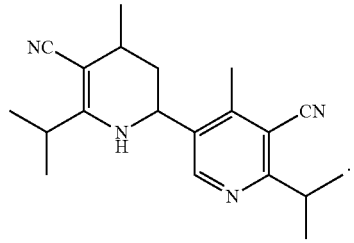 [SMILES: Cc1c(C2CC(C)C(C#N)=C(C(C)C)N2)cnc(C(C)C)c1C#N]

49. The process of any one of embodiments 1-48, wherein Compound A is substantially free of Compound C

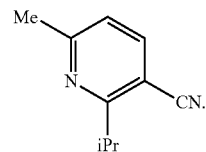

50. The process of any one of embodiments 1-48, wherein the process provides Compound A to Compound C

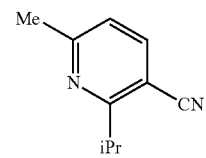 [SMILES: Cc1ccc(C#N)c(C(C)C)n1]

at a molar ratio of 1.5:1 to 99:1 or greater.

51. The process of embodiment 50, wherein the molar ratio of Compound A to Compound C is greater than 99:1.

52. The process of any one of embodiments 1-51, wherein the yield of Compound A is from 10% to 90%, based upon Compound B.

53. The process of any one of embodiments 1-52, wherein the yield of Compound A is from 50% to 75%, based upon Compound B.

54. The process of any one of embodiments 1-53, further comprising admixing pyrrolidine and hydrochloric acid in a second solvent to form pyrrolidine hydrochloride.

55. The process of any one of embodiments 1-54, further comprising heating Compound A or a salt thereof to a temperature of at least 30° C. in the presence of an acid or a base to form Compound F or a salt thereof

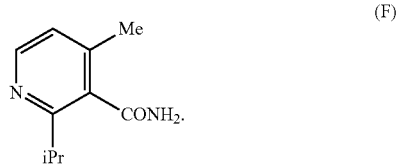 [SMILES: Cc1ccnc(C(C)C)c1C(N)=O]

(F)

56. The process of embodiment 55, wherein Compound A or a salt thereof is heated to a temperature of 65° C. to 110° C.

57. The process of embodiment 55 or 56, wherein the temperature is 100° C.

58. The process of any one of embodiments 55-57, wherein the acid is selected from the group consisting of sulfuric acid, hydrochloric acid, phosphoric acid, and a combination thereof.

59. The process of any one of embodiments 55-58, wherein the acid comprises sulfuric acid.

60. The process of any one of embodiments 55-57, wherein the base comprises a metal hydroxide.

61. The process of any one of embodiments 55-57 and 60, wherein the base is a metal hydroxide.

62. The process of embodiment 60 or 61, wherein the metal hydroxide is sodium hydroxide.

63. The process of any one of embodiments 1-62, further comprising admixing Compound F with an oxidizing agent and a base to form Compound G

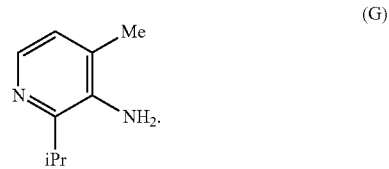 [SMILES: Cc1ccnc(C(C)C)c1N]

(G)

64. The process of embodiment 63, wherein the oxidizing agent is selected from the group consisting of sodium hypochlorite, sodium hypobromide, N-bromosuccinimide, lead tetraacetate, and a combination thereof.

65. The process of embodiment 63 or 64, wherein the oxidizing agent comprises sodium hypochlorite.

66. The process of any one of embodiments 63-65, wherein the base is selected from the group consisting of sodium hydroxide, potassium hydroxide, 1,8-diazabicyclo[5.4.0]undec-7-ene, and a combination thereof.

67. The process of any one of embodiments 63-66, wherein the base comprises sodium hydroxide.

68. The process of any one of embodiments 55-67, wherein the heating of any of embodiments 55-67 and the admixing of any of embodiments 63-67 are performed in a single reaction vessel.

69. The process of any one of embodiments 1-68, further comprising using any one of Compound A or a salt thereof, Compound B or a salt thereof, Compound F or a salt thereof, and Compound G or a salt thereof to form sotorasib.

70. The process of any one of embodiments 1-54, further comprising using Compound A or a salt thereof to form Compound F or a salt thereof.

71. The process of any one of embodiments 55-62, further comprising using Compound F or a salt thereof to form Compound G or a salt thereof.

72. The process of embodiment 71, wherein Compound G is crystalline and characterized by a X-ray powder diffraction (XRPD, CuKα radiation (1.54 Å) pattern comprising peaks (±0.2° 2θ) at 7.17, 8.59, 11.44, 12.76, 13.62, 14.17, 15.34, 17.69, 20.25, 24.05, 24.34, 25.56, 29.85, 30.12, 31.38, and 34.37.

73. The process of embodiment 72, wherein Compound G is characterized by a X-ray powder diffraction (XRPD) pattern comprising peaks (±0.2° 2θ) at 7.17, 8.57, 12.74, 13.61, 21.53, 24.35, 29.85, and 34.99.

74. The process of embodiment 72 or 73, wherein Compound G is anhydrous.

75. The process of any one of embodiments 72-74, wherein the Compound G is characterized by a unit cell having the following unit cell dimensions when measured at −173° C.: a=13.0 Å; b=8.2 Å; c=24.9 Å; α=90°; γ=90°; and β=101.7°.

76. The process of any one of embodiments 72-74, wherein the Compound G is characterized by a unit cell having the following unit cell dimensions when measured at 23° C.: a=13.9 Å; b=8.4 Å; c=25.4 Å; α=90°; γ=90°; and β=103.1°.

77. The process of embodiment 71, wherein Compound G is crystalline and characterized by a X-ray powder diffraction (XRPD, CuKα radiation (1.54 Å) pattern comprising peaks (±0.2° 2θ) at 10.82, 11.76, 14.07, 15.26, 16.02, 17.78, 20.79, 21.73, 22.27, 23.62, 24.78, 26.03, 29.2 30.04, 31.09, 32.22, 36.76, 40.39 and 41.44.

78. The process of embodiment 77, wherein Compound G is characterized by a X-ray powder diffraction (XRPD) pattern comprising peaks (±0.2° 2θ) at 10.82, 21.73, 30.04, 32.22 and 40.39.

79. The process of embodiment 77 or 78, wherein Compound G is a hemihydrate.

80. The process of any one of embodiments 77-79, wherein the Compound G is characterized by a unit cell having the following unit cell dimensions when measured at −173° C.: a=11.5 Å; b=9.8 Å; c=8.1 Å; α=90°; γ=90°; and β=90°.

81. The process of any one of embodiments 75-77, wherein the Compound G is characterized by a unit cell having the following unit cell dimensions when measured at 23° C.: a=8.2 Å; b=9.9 Å; c=11.6 Å; α=90°; γ=90°; and β=90°.

EXAMPLES

The following examples further illustrate the disclosed processes, but of course, should not be construed as in any way limiting their scope.

The following abbreviations are used herein: NMR refers to nuclear magnetic resonance; rt refers to room temperature; EOR refers to end of reaction; LC refers to liquid chromatography; Jorgenson's catalyst refers to (2R)-2-[diphenyl[(trimethylsilyl)oxy]methyl]pyrrolidine unless otherwise specified; and LCAP refers to liquid chromatography area percentage.

General Experimental Information

General Reagent Information. Pyrrolidine, anhydrous hydrogen chloride solution (3 M in cyclopentyl methyl ether), Iron (III) chloride (anhydrous, powder, ≥99.99% trace metals basis) and anhydrous acetonitrile (MeCN) were purchased from Sigma Aldrich and used as received. Pyrrolidine hydrochloride salt was freshly prepared prior to cyclization reactions. 1,2,4,5-Tetrachloro-3-nitrobenzene (TCNB) was used as internal standard for the NMR quantitative analyses in the reaction optimization. All other reagents and solvents were obtained from various commercial vendors and used as received.

General Procedure for Synthesizing Compound A. A reaction vessel (e.g., a screw-cap scintillation vial (Chemglass, 20.0 mL, catalog no. CG-4912-05)) was charged with a magnetic stir bar (Biotage, egg-shaped, part no. 353930), NH3 source (1.0 equiv) or Bronsted acid (1.0 equiv), or Iron (III) chloride (29.4 mg, 0.18 mmol, 0.1 equiv), or organocatalyst (free base or salt, per indicated stoichiometry in tables) and toluene or acetonitrile (2 mL). The catalyst solution was stirred at rt for 10 min. To the catalyst solution was charged crotonaldehyde (3.63 mmol, 2.0 equiv) and Compound B (1.81 mmol, 1 equiv). The vessel was closed (e.g., vial capped) and the reaction mixture was stirred at indicated temperature for indicated reaction time. Work-up: the reaction mixture was then cooled to rt and neutralized by 6 N NaOH (i.e., equal stoichiometry to acid catalysts). The solution was stirred for 5 min, transferred to a 25 mL round bottom flask. The organic layer was separated from the aqueous layer and concentrated under vacuo. Result analysis: The resulting residue was passed through a short silica pad, concentrated under vacuo and analyzed by $^1$H NMR for the quantitative yield (i.e., determined by the weight amounts of internal standards and reaction aliquot, and the respective ratio of proton integral) and regioselectivity (i.e., determined by the ratio of proton integral). $^1$H NMR (500 MHZ, CDCl$_3$) δ 8.57 (d, J=5.1 Hz, 1H), 7.11 (d, J=5.1 Hz, 1H), 3.55 (spt, J=6.8 Hz, 1H), 2.55 (s, 3H), 1.35 (d, J=6.8 Hz, 6H). $^{13}$C NMR (126 MHZ, CDCl$_3$) δ 169.9, 151.6, 151.4, 122.2, 115.8, 108.9, 34.6, 21.7 (2C), 20.5. IR (neat, cm$^{-1}$): 2968, 2931, 2223, 1578, 1563, 1469, 1408, 1380, 1361, 1334, 1106, 933, 833, 431. HRMS (DART-TOF) m/z: [M+H]$^+$ Calcd for C$_{10}$H$_{13}$N$_2$ 161.1073. Found 161.1074.

Procedure for Synthesizing Compound C: A reaction vessel (e.g., 25 mL round-bottom flask) equipped with a condenser and a magnetic stir bar (Biotage, egg-shaped, part no. 353930) was charged Compound B (1.66 mmol, 1 equiv), 3-oxobutanal as sodium salt (3.32 mmol, 2.0 equiv) and anhydrous 1,4-dioxane (1.0 mL). The solution was cooled to 0° C. before hydrogen chloride solution (0.82 mL, 4.0 M, dioxane) was charged. The reaction mixture was heated to 110° C. and stirred overnight. Work-up: the reaction mixture was then cooled to rt and neutralized by 6 N NaOH (i.e., equal stoichiometry to acid catalysts). The solution was stirred for 5 min, transferred to a 25 mL round bottom flask. The organic layer was separated from the aqueous layer and concentrated under vacuo. Compound C was purified by Biotage Isolera™ Spektra Systems with ACI™ (5% ethyl acetate in heptane) in 15% isolated yield as a yellow oil. $^1$H NMR (500 MHZ, CDCl$_3$) δ 7.77 (d, J=7.9 Hz, 1H), 7.08 (d, J=7.9 Hz, 1H), 3.52 (spt, J=6.9 Hz, 1H), 2.62 (s, 3H), 1.36 (d, J=6.9 Hz, 6H) $^{13}$C NMR (126 MHZ, CDCl$_3$) δ 169.1, 162.3, 140.1, 120.3, 117.2, 104.5, 34.5, 24.9 (2C), 21.5.

Procedure for Synthesizing Compound D: A reaction vessel (e.g., 50 mL round-bottom flask) was charged with a magnetic stir bar (Biotage, egg-shaped, part no. 353930), Iron (III) chloride (29.4 mg, 0.18 mmol, 0.1 equiv), pyrrolidine hydrochloride (0.5 equiv) and acetonitrile (2.0 mL). To the catalyst solution was charged crotonaldehyde (3.63 mmol, 2.0 equiv) and Compound B (1.81 mmol, 1 equiv). The reaction mixture was stirred at rt overnight and concentrated under vacuo. Compound D was purified by Biotage Isolera™ Spektra Systems with ACI™ (5 to 20% ethyl acetate in heptane) in 14% isolated yield as a yellow solid. $^1$H NMR (600 MHZ, ACETONITRILE-d$_3$) δ 5.11 (br s, 2H), 4.97 (br s, 1H), 3.87-3.97 (m, 1H), 3.01 (td, J=6.95, 13.94 Hz, 1H), 2.93 (spt, J=7.03 Hz, 1H), 2.42-2.49 (m, 1H), 1.78 (ddd, J=5.38, 8.83, 13.03 Hz, 1H), 1.49 (td, J=4.10, 13.01 Hz, 1H), 1.15 (td, J=7.43, 13.29 Hz, 15H). $^{13}$C NMR (151 MHZ, acetonitrile-d$_3$) δ 20.77 (s, 1C) 22.22 (s, 1C) 28.30 (s, 1C) 33.57 (s, 1C) 34.20 (s, 1C) 34.53 (s, 1C) 45.06 (s, 1C) 76.76 (s, 1C) 78.97 (s, 1C) 121.49 (s, 1C) 123.17 (s, 1C) 162.40 (s, 1C) 166.04 (s, 1C). HRMS (DART-TOF) m/z: [M+H]$^+$ Calcd for C$_{16}$H$_{25}$N$_4$ 273.2074. Found 273.2074.

Procedure for Synthesizing Compound E: A reaction vessel A reaction vessel (e.g., a screw-cap scintillation vial (Chemglass, 20.0 mL, catalog no. CG-4912-05) was charged with a magnetic stir bar (Biotage, egg-shaped, part no. 353930), pyrrolidine hydrochloride (0.5 equiv) and dimethylsulfoxide (20.0 mL). To the catalyst solution was charged crotonaldehyde (3.63 mmol, 2.0 equiv) and Compound B (1.81 mmol, 1 equiv). The reaction mixture was stirred at 60° C. for 12 h. Work-up: the reaction mixture was then cooled to rt and neutralized by 6 N NaOH (i.e., equal stoichiometry to acid catalysts). The solution was stirred for 5 min, transferred to a 250 ml separatory funnel. 100 ml water was charged into the funnel to aid phase split. Ethyl acetate was used to extract organic content from the aqueous layer. Combined organic layer was dried over MgSO$_4$ and concentrated under vacuo. Compound E was purified by Biotage Isolera™ Spektra Systems with ACI™ (5 to 20% % ethyl acetate in heptane) in 10% isolated yield as a yellow solid. $^1$H NMR (600 MHZ, acetonitrile-d$_3$) δ 8.42 (s, 1H), 5.42 (br s, 1H), 4.68-4.78 (m, 1H), 3.48 (spt, J=6.74 Hz, 1H), 3.06 (spt, J=7.01 Hz, 1H), 2.52 (s, 3H), 2.16-2.24 (m, 1H), 1.79-1.87 (m, 1H), 1.60-1.68 (m, 1H), 1.29 (dd, J=3.74, 6.71 Hz, 6H), 1.23 (d, J=7.02 Hz, 3H), 1.17 (d, J=7.10 Hz, 3H), 1.12-1.15 (m, 3H). $^{13}$C NMR (151 MHZ, ACETONITRILE-d$_3$) δ 17.54 (s, 1C) 20.68 (s, 1C) 20.94 (s, 1C) 21.26 (s, 1C) 22.04 (s, 1C) 22.17 (s, 1C) 26.49 (s, 1C) 33.63 (s, 1C) 35.25 (s, 1C) 35.44 (s, 1C) 48.35 (s, 1C) 77.40 (s, 1C) 110.19 (s, 1C) 117.25 (s, 1C) 122.37 (s, 1C) 136.00 (s, 1C) 149.28 (s, 1C) 151.20 (s, 1C) 162.58 (s, 1C) 169.20 (s, 1C).

General Purification Information. All work-up and purification procedures were carried out with reagent-grade solvents. Organic solutions were concentrated in vacuo with the aid of a Buchi rotary evaporator. Unless otherwise indicated, compounds were purified by flash column chromatography using 40-63 μm silica gel (SiliCycle SiliaFlash® F60), or with the aid of a Biotage Isolera™ Spektra Systems with ACI™.

General Analytical Information. All substrates and products were characterized by $^1$H NMR, $^{13}$C NMR, IR spectroscopy, elemental analysis or HRMS and melting point analysis (if solids). $^1$H and $^{13}$C NMR spectra were recorded with a Bruker 600 MHZ (Avance-600) with a 100-position SampleXpress sample changer ($^1$H, 600 MHZ; $^{13}$C, 151 MHZ), Bruker 500 MHZ (Avance-500) with a 5 mm BBFO z-gradient probe ($^1$H, 500 MHz; $^{13}$C, 126 MHZ), Bruker 400 MHZ (Avance III-400) with a 25-position SampleXpress sample changer, or a Bruker 400 MHZ (Avance-400) instrument ($^1$H, 400 MHz; $^{13}$C, 101 MHZ). All 600 MHZ NMR data was collected in samples dissolved in acetonitrile-d$_3$ with $^1$H referencing to the residual solvent peak at 1.96 ppm and $^{13}$C referencing to the solvent signal at 1.39 ppm. All $^1$H NMR data are reported in δ units, parts per million (ppm), and were measured relative to the residual proton signal in the deuterated solvent at 7.26 ppm (CDCl$_3$). All $^{13}$C NMR spectra are $^1$H decoupled and reported in ppm relative to the solvent signal at 77.16 ppm (CDCl$_3$). Data are reported as following: chemical shift, multiplicity (s=singlet, d=doublet, dd=doublet of doublets, t=triplet, td=triplet of doublets, q=quartet, quin=quintet, sep=septet, m=multiplet, br=broad singlet), coupling constants J (Hz), and integration. Integration of the aromatic proton signals in the $^1$H NMR from Compounds A and C could be used to monitor reaction yields and selectivity using 1,2,4,5-tetrachloro-3-nitrobenzene (TCNB) as an internal standard.

IR spectra were recorded on a Thermo Scientific Nicolet iS5 FT-IR spectrometer (iD5 ATR, diamond) and are reported in terms of frequency of absorption (cm$^{-1}$). High-resolution mass spectra were recorded on ThermoFischer Q-Exactive.

Products were also analyzed using high-performance liquid chromatography (HPLC). Illustrative HPLC conditions for an analysis include the following:

In some examples below, the reactions yields and purity were determined using quantitative HPLC using the method described in Table 1. The method (34 min) is calibrated with Compounds A (t$_r$=16.446 min), Compound D (t$_r$=17.125 min), and Compound E (t$_r$=24.496 min). The HPLC method used a two-component mobile phase containing 20 mM ammonium formate in water (mobile phase A) and acetonitrile (mobile phase B). Samples were diluted using 50% (v/V) acetonitrile in water.

TABLE 1

HPLC Operating Conditions

| | |
|---|---|
| Column temperature set point | 21° C., set ±1° C. as alarming limits |
| Autosampler temperature | 5 ± 5° C. |
| Flow rate | 0.9 mL/min |
| Injection volume | 5 μL |

| Gradient | Time (min) | % A | % B |
|---|---|---|---|
| | 0.0 | 95 | 5 |
| | 5.0 | 75 | 25 |
| | 25.0 | 35 | 65 |
| | 26 | 10 | 90 |
| | 29.0 | 10 | 90 |
| | 29.1 | 95 | 5 |
| | 34 | 95 | 5 |
| Acquisition time | 34 minutes | | |
| UV detection | 256 nm, also collect 240 nm Slit: 4 nm Set "Bandwidth" to "4", "Reference Wavelength" to "OFF" Sampling rate: 5Hz | | |

The retention time (RT) of Compounds A, D, and E and the corresponding peak areas were used to evaluate yields and product distribution.

Differential Scanning calorimetry (DSC) Analysis: DSC data is collected using a TA Instruments Q200 DSC. Approximately, 2-8 mg of the sample was placed in a Tzero hermetic alodined aluminum pan and sealed with Tzero hermetic lid and was equilibrated at 25° C. for 5 min and scanned from about 25° C. to 80-100° C. at a rate of about 10° C./min under a nitrogen purge of about 50 mL/min.

Thermogravimetric Analysis (TGA): TGA measurements are recorded using a TA Q500 instrument. Approximately, 10-20 mg sample was added to a pre-tared TGA aluminum pan. TGA run was performed by equilibrating the sample at 25° C. for 5 min at a heating rate of about 10° C./min over a temperature range of from about 25° C. to 80-100° C. with purging with nitrogen at a flow rate of about 60 mL/min.

X-Ray Powder Diffraction (XRPD) Analysis: XRPD data was obtained using a PANalytical X'Pert PRO diffractometer. Samples were scanned at ambient temperature (20-23° C.) in continuous mode from 5-45 degrees (2θ) with step size of 0.0334 degrees at 45 kV and 40 mA with CuKα radiation (1.54 Å). The incident beam path was equipped with a 0.02 rad soller slit, 15 mm mask, 4 degrees fixed anti-scatter slit and a programmable divergence slit. The diffracted beam was equipped with a 0.02 rad soller slit, programmable anti-scatter slit and a 0.02 mm nickel filter. Samples were prepared on a low background sample holder and placed on a spinning stage with a rotation time of 2 s.

Single Crystal X-Ray Diffraction (SCXRD) Analysis:

Preparation of single crystals for Form 1 Compound G and Form 2 Compound G: Single crystals of Form 1 Compound G were obtained by drying a sample of Form 2 under vacuum at 40° C. for 4 days. A sample of Form 2 was suspended in 1:9 MeCN:H$_2$O and was used for SCXRD analysis.

Forms 2 SCXRD data collection: A colorless irregular-shaped-shaped crystal with dimensions 0.33×0.27×0.19 mm3 was mounted on a nylon loop with paratone oil. Data were collected using a XtaLAB Synergy, Dualflex, HyPix diffractometer equipped with an Oxford Cryosystems low-temperature device, operating at T=100.00 (17) K. CRI Data were measured using scans using CuKα radiation (microfocus sealed X-ray tube, 50 kV, 1 mA). The total number of runs and images was based on the strategy calculation from the program CrysAlisPro 1.171.41.112a (Rigaku OD, 2021). The achieved resolution was Θ=80.130.

Form 1 SCXRD data collection: A colorless irregular-shaped-shaped crystal with dimensions 0.16×0.09×0.05 mm3 was mounted on a nylon loop with paratone oil. Data were collected using a XtaLAB Synergy, Dualflex, HyPix diffractometer equipped with an Oxford Cryosystems low-temperature device, operating at T=99.98 (18) K. CRI Data were measured using scans using CuKα radiation (microfocus sealed X-ray tube, 50 kV, 1 mA). The total number of runs and images was based on the strategy calculation from the program CrysAlisPro 1.171.41.112a (Rigaku OD, 2021). The achieved resolution was Θ=80.354.

Karl-Fisher (KF) Analysis: Water content (KF) was measured using a coulometric KF titration using Hydranal Coulomat AK reagent.

Comparative Example

This comparative example demonstrates processes comprising admixing Compound B (1 equiv) and crotonaldehyde (neat) at 110° C. for 2 hours under solvent-free conditions as listed in Table 2.

The yields were determined by quantitative $^1$H NMR using 1,2,4,5-tetrachloro-3-nitrobenzene (TCNB) as the internal standard and selectivity was determined by aromatic proton integral ratio of Compounds A and C.

TABLE 2

Results with Ammonia source and Bronsted acids

| Entry | Crotonaldehyde (equiv) | NH$_3$ Source (1 equiv) | Bronsted Acid (1 equiv) | Yield Cpd A (%) | Regioselectivity (Cpd A:Cpd C) |
|---|---|---|---|---|---|
| 1 | 2.0 | NH$_4$OAc | — | 29 | 4.8:1 |
| 2 | 5.0 | NH$_4$OAc | — | 38 | 14:1 |
| 3 | 2.0 | — | citric acid | 22 | >99:1 |
| 4 | 2.0 | — | HCl/dioxane | 16 | 1.7:1 |
| 5 | 2.0 | — | BzOH | 24 | 14:1 |
| 6 | 2.0 | — | MsOH | 18 | 1.8:1 |

Example 1

This example demonstrates embodiments of the disclosed processes for preparing Compound A using a catalytic reagent comprising a Lewis acid and an organocatalyst. The product Compound A had the following analytical properties: $^1$H NMR (500 MHZ, CDCl$_3$) δ 8.57 (d, J=5.1 Hz, 1H), 7.11 (d, J=5.1 Hz, 1H), 3.55 (spt, J=6.8 Hz, 1H), 2.55 (s, 3H), 1.35 (d, J=6.8 Hz, 6H). $^{13}$C NMR (126 MHZ, CDCl$_3$) δ 169.9, 151.6, 151.4, 122.2, 115.8, 108.9, 34.6, 21.7 (2C), 20.5. IR (neat, cm$^{-1}$): 2968, 2931, 2223, 1578, 1563, 1469, 1408, 1380, 1361, 1334, 1106, 933, 833, 431. HRMS (DART-TOF) m/z: [M+H]$^+$ Calcd for C$_{10}$H$_{13}$N$_2$ 161.1073. Found 161.1074.

The product Compound C had the following analytical properties: $^1$H NMR (500 MHZ, CDCl$_3$) δ 7.77 (d, J=7.9 Hz, 1H), 7.08 (d, J=7.9 Hz, 1H), 3.52 (spt, J=6.9 Hz, 1H), 2.62 (s, 3H), 1.36 (d, J=6.9 Hz, 6H) $^{13}$C NMR (126 MHZ, CDCl$_3$) δ 169.1, 162.3, 140.1, 120.3, 117.2, 104.5, 34.5, 24.9 (2C), 21.5.

Compound B (200 mg) and crotonaldehyde (2 equiv) were admixed in acetonitrile (10 volumes) in the presence of FeCl$_3$ (10 mol %) and (2R)-2-[diphenyl[(trimethylsilyl)oxy]methyl]pyrrolidine (i.e., Hayashi-Jørgensen catalyst) for 4 hours under the conditions set forth in Table 2a. Entry 1 did not contain an organocatalyst. Entry 5 was conducted in a glove box with less than 10 ppm O$_2$. Entry 6 was conducted in the presence of 1 equiv of water. Entries 7 and 8 were conducted using 2 g of Compound B. The results are shown in Table 3.

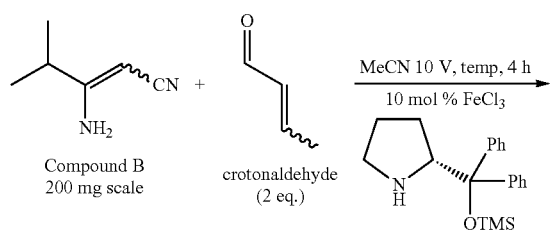

Compound B
200 mg scale crotonaldehyde
(2 eq.)

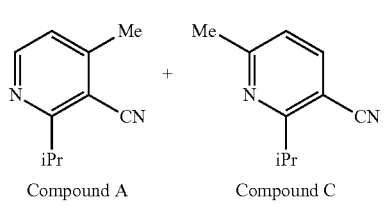

Compound A        Compound C

TABLE 3

Results with FeCl$_3$ and Hayashi-Jørgensen organocatalyst in acetonitrile

| Entry | Temp (° C.) | Yield (%) Cpd A | Regioselectivity (Cpd A:C) |
|---|---|---|---|
| 1$^a$ | 80 | 36 | 10:1 |
| 2 | rt | 11 | >99:1 |
| 3 | 50 | 39 | >99:1 |
| 4 | 80 | 66 | >99:1 |
| 5$^b$ | 80 | 68 | >99:1 |
| 6$^c$ | 80 | 55 | >99:1 |
| 7$^d$ | 80 | 53 (at 2.5 h) 40% isolated yield | — |
| 8$^d$ | 80 | 67 (at 12 h) 53% isolated yield | — |

$^a$no organocatalyst;
$^b$glove box; O$_2$ level <10 ppm;
$^c$1 equiv H$_2$O;
$^d$2 g Compound B The yields were determined by the quantitative $^1$H NMR and selectivity was determined by aromatic proton integral ratio in Compounds A and C.

As demonstrated by the results in Table 3, the presence of an organocatalyst such as Hayashi-Jørgensen catalyst promotes 1,4-addition with an exclusive regioselectivity, oxygen does not serve as an exogenous oxidant, and the presence of water only slightly compromises the yield. Entries 3-5 demonstrate the robustness of the reaction at a relatively higher temperature (80° C. vs. 50° C.). Entries 7 and 8 demonstrate the isolated yields on a multi-gram scale (2 g) and at relatively short time scale (2.5 h; Entry 7), as well as a relatively long time scale (12 h; Entry 8).

Example 2

This example demonstrates embodiments of the disclosed processes for preparing Compound A using a catalytic reagent comprising a Lewis acid and an organocatalyst.

Compound B and crotonaldehyde (2 equiv) were admixed in acetonitrile (10 volumes) at 80° C. for 4 hours in the presence of 10 mol % FeCl$_3$ and an organocatalysts as set forth in Table 4.

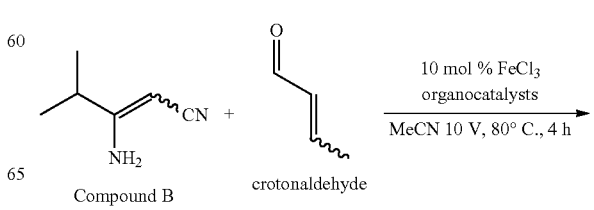

Compound B        crotonaldehyde

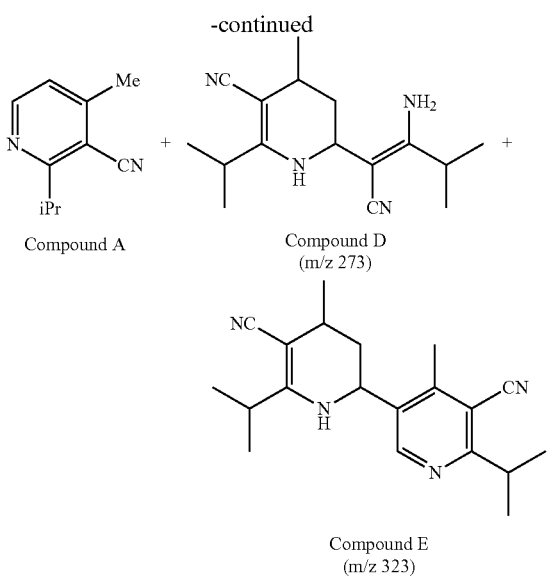

Compound A

Compound D
(m/z 273)

Compound E
(m/z 323)

TABLE 4

Organocatalysts

| Entry | Organocatalysts | Organocat mol % | Yield (%) Cpd A | Yield (%) Cpd D | Yield (%) Cpd E |
|---|---|---|---|---|---|
| 1 | Hayashi-Jørgensen cat.* | 10 | 56 | 11 | — |
| 2 | Pyrrolidine | 10 | 54 | 15 | — |
| 3 | Pyrrolidine HCl | 10 | 64 | — | 1.1 |
| 4 | Pyrrolidine HCl | 50 | 67 | — | 3.0 |
| 5 | Pyrrolidine HCl | 100 | 68 | — | 3.4 |
| 6 | Pyrrolidine HCl | 200 | 64 | — | 4.8 |

*(2R)-2-[diphenyl[(trimethylsilyl)oxy]methyl]pyrrolidine

The yields of Compounds A, D, E were determined by the quantitative HPLC method illustrated in Table 1.

As demonstrated by the results shown in Table 4, secondary amines and salts thereof kinetically accelerate the formation of Compound A via Compound D, as evident by the minimization of the amount of Compound D. The data indicate that achiral pyrrolidine hydrochloride (Entries 3-6) provides full conversion of conversion of Compound D and a higher yield of Compound A compared to the free base (Entry 2) and the more expensive chiral catalyst (Entry 1) Moreover, the process demonstrates a wide capability regarding the equivalency of organocatalyst (e.g., pyrrolidine HCl) as evidenced by the minor variance on product yield (see Entries 3-6).

Additional experiments were conducted under similar conditions using pyrrolidine HCl (1 equiv) at various reaction times and temperatures as set forth in Table 5.

TABLE 5

Reaction Time and Temperature

| Entry | Temp (° C.) | Time$^a$ (h) | Yield (%) Cpd A | Yield (%) Cpd E |
|---|---|---|---|---|
| 1 | 40 | 41 h | 69 | 2.5 |
| 2 | 60 | 17 h | 68 | 2 |
| 3 | 80 | 4 h | 68 | 3.4 |

$^a$HPLC assay indicated most of Compound D is consumed

As demonstrated by the results in Table 5, the process for preparing Compound A can be conducted at temperatures between 40-80° C. in acetonitrile such that comparable reaction yields and selectivity can be obtained at lower reaction temperatures.

Example 3

This example demonstrates embodiments of the disclosed processes for preparing Compound A using a catalytic reagent comprising a Lewis acid and an organocatalyst.

Compound B and crotonaldehyde (2 equiv) were admixed in acetonitrile (10 volumes) at 80° C. for 4 hours in the presence of 10 mol % $FeCl_3$ and various organocatalysts as set forth in Table 6.

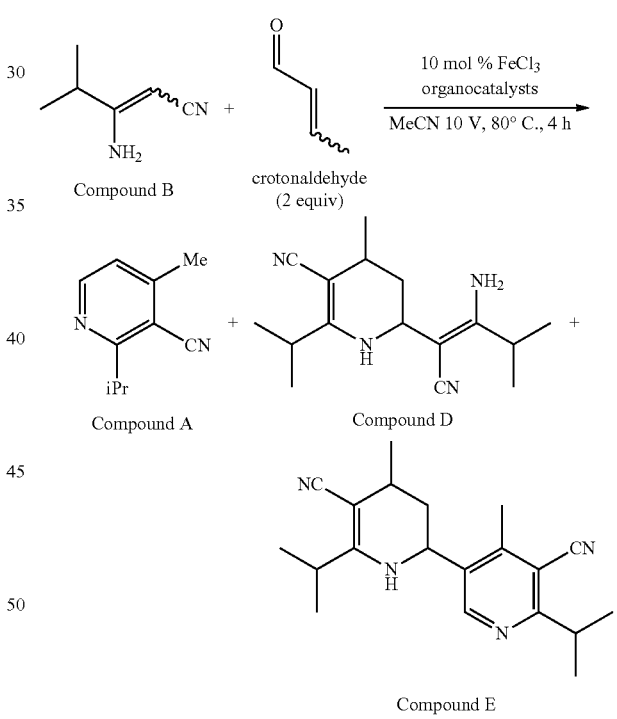

TABLE 6

| Entry | Organocatalyst | Yield (%) Cpd A | Yield (%) Cpd D | Yield (%) Cpd E |
|---|---|---|---|---|
| 1a | Hayashi-Jørgensen cat. | 57 | 5 | — |
| 1b | Hayashi-Jørgensen cat. | 55 | 10 | — |
| 2 | β-alanine | 39 | 9 | — |
| 3 | Piperidine | 47 | 10 | — |
| 4 | Morpholine | 53 | 10 | — |

TABLE 6-continued

| Entry | Organocatalyst | Yield (%) Cpd A | Yield (%) Cpd D | Yield (%) Cpd E |
|---|---|---|---|---|
| 5 | 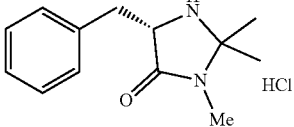 | 68 | — | 4 |
| 6 | 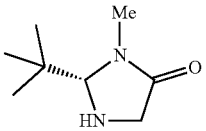 | 60 | — | 4 |
| 7 | 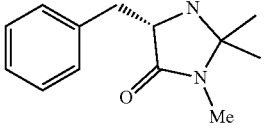 | 48 | — | — |
| 8 | 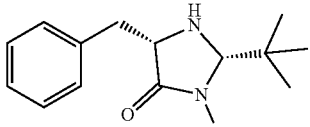 | 58 | 3 | 2 |
| 9 | 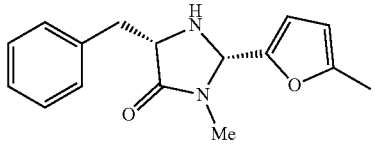 [SMILES: Cc1ccc([C@H]2N[C@@H](Cc3ccccc3)C(=O)N2C)o1] | 44 | 2 | 1 |
| 10 | DL-proline | 45 | 7 | — |
| 11 | (R)-(+)-α,α-diphenyl-2-pyrrolidinemethanol (Prolinol) | 48 | 6 | — |

The yields of Compounds A, D, E were determined by the quantitative HPLC method illustrated in Table 1.

As demonstrated by the results set forth in Table 6, processes of the disclosure comprising admixing Compound B and crotonaldehyde in acetonitrile in the presence of a catalytic reagent comprising an acid catalyst and an organocatalyst provide Compound A substantially free of side products (e.g., Compounds D and E). For example, Entries 5-7 provided Compound A substantially free of Compound D, which is indicative of complete consumption of intermediate Compound D leading to Compound A.

Example 4

This example demonstrates embodiments of the disclosed processes for preparing Compound A using a catalytic reagent comprising a Lewis acid and an organocatalyst on a multigram scale.

A reaction vessel was charged with FeCl$_3$ (10 mol %) and pyrrolidine HCl (0.5 equiv) in acetonitrile (10 V). The contents were agitated for 5 min at room temperature. The batch temperature was set to 60° C. The reaction mixture was slowly charged with Compound B (dose rate: 6 mL/h) and crotonaldehyde (2 equiv; dose rate: 30 mL/h) at T$_r$=60° C. The two dosing lines were rinsed using acetonitrile (0.1 L/kg). The reaction mixture was agitated at 60° C. until full conversion of Compound B to Compound A, as determined by HPLC described below and shown in Table 1. The reaction mixture was cooled to 20° C. and neutralized by 6 N NaOH (0.5 L/kg). The resulting solution was filtered, deliquored. and concentrated. The crude product was further purified using polish filtration and vacuum distillation. The reaction conditions are summarized in Table 7 (Entry 1). The same reaction was repeated under the condition shown in Table 7, Entries 2 and 3.

TABLE 7

| Entry | Conditions | Yield (g) Cpd A | Yield (%) (LC and wt %) | LC Purity (%) EOR | LC Purity (%) Isolated |
|---|---|---|---|---|---|
| 1 | 30 g of Cpd B; 2 equiv Crotonaldehyde; 10 V ACN | 27.2 | 60.7 and 92 | 47.6 | 80.1 |
| 2 | 20 g of Cpd B; 5 equiv Crotonaldehyde; 10 V ACN | 16.3 | 57.3 and 97 | 36.7 | 82.6 |
| 3 | 5 g scale; 2 equiv Cpd B; 10V 2-MeTHF | 3.7 | 53.5 and — | 47.1 | 77.8 |

The yield of Compounds A was determined by the quantitative HPLC method illustrated in Table 1.

As demonstrated by the results set forth in Table 7, the disclosed processes can provide Compound A on a multigram scale in good yields and with high purity. The use of acetonitrile results in higher yields when compared to 2-MeTHF (Entry 1 vs. Entry 3).

Example 5

This example demonstrates embodiments of the disclosed processes comprising converting Compound A or a salt thereof to Compound F or a salt thereof and/or converting Compound F or a salt thereof to Compound G or a salt thereof.

Compound F had the following physical properties: $^1$H NMR (500 MHZ, DMSO-d6) δ (ppm)=8.38 (d, J=4.9 Hz, 1H), 7.93 (br s, 1H), 7.65 (br s, 1H), 7.08 (d, J=5.1 Hz, 1H), 3.13 (spt, J=6.7 Hz, 1H), 2.25 (s, 3H), 1.20 (d, J=6.7 Hz, 6H); $^{13}$C NMR (126 MHZ, DMSO-d6) δ (ppm)=170.3, 161.6, 148.6, 143.0, 133.5, 122.9, 32.8, 23.1, 18.9. IR (neat, cm$^{-1}$): 3253, 3069, 2962, 1611, 1590, 1464, 1447, 1429, 1380, 812, 732, 696, 689, 616, 438. HRMS (DART-TOF) m/z: [M+H]$^+$ Calcd for C10H15N2O+ 179.1179. Found 179.1172.

Compound G had the following physical properties: $^1$H NMR (500 MHZ, DMSO-d6) δ (ppm)=8.45 (s, 1H), 7.67 (d, J=4.7 Hz, 1H), 6.78 (d, J=4.7 Hz, 1H), 4.70 (br s, 2H), 3.25-3.13 (m, 1H), 2.08 (s, 3H), 1.15 (d, J=6.7 Hz, 6H); $^{13}$C NMR (126 MHZ, DMSO-d6) δ (ppm)=149.7, 139.5, 136.8, 128.9, 123.3, 29.0, 21.8, 17.8. IR (neat, cm$^{-1}$): 3348, 3231, 2962, 2929, 2866, 1620, 1590, 1468, 1453, 1418, 1219, 1053, 818, 535. HRMS (DART-TOF) m/z: [M+H]$^+$ Calcd for C9H15N2+ 151.1230. Found 151.1224.

A reaction vessel (e.g., a screw-cap scintillation vial (Chemglass, 20.0 mL, catalog no. CG-4912-05)) was charged with a magnetic stir bar (Biotage, egg-shaped, part no. 353930), Compound A (500 mg, 1.0 equiv), sulfuric acid (3.5 equiv, 0.47 mL) and water (2.0 L/kg, 1 mL). The contents were agitated, and the batch temperature was set to 105° C. The reaction mixture was agitated at 105° C. for 18 hours. The reaction mixture was cooled to 10° C. and neutralized by 6 N NaOH. The resulting suspension was filtered and washed by water (3×5 mL). The filtered product was further purified by Biotage chromatography (Eluent: 10% MeOH in dichloromethane) to give 268 mg of Compound F in 60% isolated yield.

A reaction vessel (e.g., a screw-cap scintillation vial (Chemglass, 20.0 mL, catalog no. CG-4912-05)) was charged with a magnetic stir bar (Biotage, egg-shaped, part no. 353930), Compound F (106 mg, 1.0 equiv), sodium hypochlorite solution (1.15 equiv, 0.39 mL) and sodium hydroxide (1N, 1.19 mL). The contents were agitated, and the batch temperature was set to 80° C. The reaction mixture was agitated at 80° C. for 18 hours. The reaction mixture was cooled to 25° C. and charged 10 wt % sodium bisulfite (0.65 mL). The resulting solution was extracted by ethyl acetate (3×5 mL). The organic layer was combined, dried over anhydrous MgSO$_4$ and concentrated under vacuo and analyzed quantitatively by $^1$H NMR for the conversion of Compound F and yield of Compound G.

Example 6

This example demonstrates embodiments of the disclosed processes for preparing Compound A or a salt thereof comprising admixing Compound B (10 mg) and crotonaldehyde (2.5 equiv) in the presence of 10 mol % of Lewis acid catalyst and acetonitrile (10 V) at 80° C. overnight under a N$_2$ atmosphere. Six processes were conducted using the conditions set forth below and Table 8.

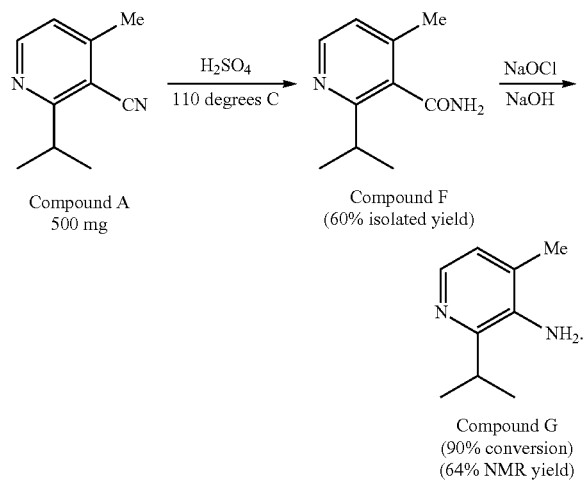

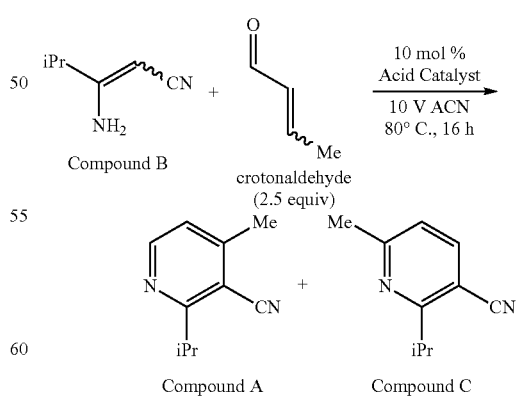

The products were analyzed using ultra performance liquid chromatography (UPLC) using the following conditions: column-ACQUITY BEH C18 column (2.1×50 mm; 1.7 µm) (Waters Corp.; Milford, MA); mobile phase A was 0.1% trifluoric acid in acetonitrile; mobile phase B was 0.1% trifluoric acid in water; flow rate of 0.6 mL/min; and a stepwise gradient (A:B): $t_0$=5:95; $t_6$=95:5; and $t_{8.1}$=5:95. Liquid chromatography area percents (LCAPs) were determined from integrating peaks from the UPLC chromatogram. Compound A had a retention time of 2.372 min. Compound C had a retention time of 2.735 minutes. The results are summarized in Table 8.

TABLE 8

Acid Catalysts

| Entry | Acid Catalyst (10 mol %) | Compound A (LCAP) | Compound C (LCAP) |
|---|---|---|---|
| 1 | TMSOTf | 33.4 | 0.6 |
| 2 | TfOH | 29.2 | Nd* |
| 3 | BF$_3$*Et$_2$O | 35.1 | Nd* |
| 4 | La((OTf)$_3$ | 53.6 | 0.3 |
| 5 | Zn(OTf)$_2$ | 54.6 | 0.4 |
| 6 | FeCl$_3$ | 54.5 | 0.2 |

*Nd—not detected

As demonstrated by the results set forth in Table 8, Entries 4-6 provide Compound A in high yield with good regioselectivity. Moreover, Entry 6 provided one of the highest yields of Compound A while using a relatively inexpensive acid catalyst (FeCl$_3$). In addition, FeCl$_3$ is suitable for conducting the disclosed processes on a large scale.

Example 7

This example demonstrates embodiments of the disclosed processes for preparing Compound A comprising admixing Compound B and crotonaldehyde in the presence of an acid catalyst (10 mol % FeCl$_3$) and a solvent (acetonitrile). Twelve processes were conducted using the conditions set forth below and Table 9.

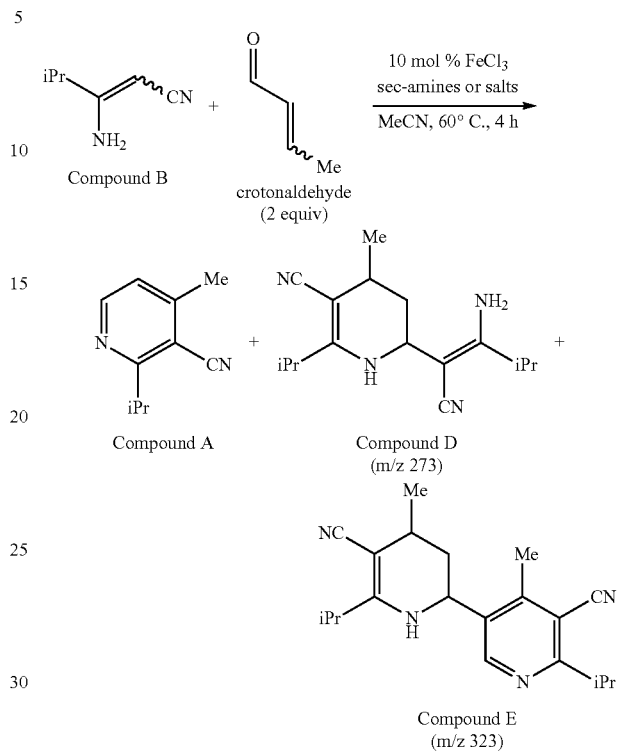

TABLE 9

| Entry | Organocatalyst (0.1 equiv) | Yield$^c$ (%) Cpd A | Yield$^c$ (%) Cpd D | Yield$^c$ (%) Cpd E |
|---|---|---|---|---|
| 1 | (pyrrolidine with diphenyl OTMS) | 56 | 11 | — |
| 2 | (benzyl imidazolidinone·HCl) | 68 | — | 4 |
| 3 | (tBu imidazolidinone, TFA) | 60 | — | 4 |

TABLE 9-continued

| Entry | Organocatalyst (0.1 equiv) | Yield[c] (%) Cpd A | Yield[c] (%) Cpd D | Yield[c] (%) Cpd E |
|---|---|---|---|---|
| 4 | [benzyl-imidazolidinone with 2,2-diMe, N-Me; and dichloroacetic acid co-catalyst] | 48 | — | — |
| 5 | [benzyl-imidazolidinone with 2-tBu, N-Me] | 58 | 3 | 2 |
| 6 | [benzyl-imidazolidinone with 2-(5-methylfuran-2-yl), N-Me] | 44 | 2 | 1 |
| 7 | morpholine | 53 | 10 | — |
| 8 | piperidine | 47 | 10 | — |
| 9 | pyrrolidine | 54 | 15 | — |
| 10 | pyrrolidine HCl | 64 | — | 1.1 |
| 11 | pyrrolidine HCl [a] | 67 | — | 3.0 |
| 12 | pyrrolidine HCl [b] | 68 | — | 3.4 |

[a] 0.5 equiv; [b] 1.0 equiv

The yields of Compounds A, D and E were determined by the quantitative $^1$H NMR.

As demonstrated by the results set forth in Table 9, catalytic reagents comprising an amine salt (e.g., pyrrolidine HCl) provided faster reaction kinetics (based on yield of Compound D) and higher yields of Compound A catalytic reagents comprising a free base (e.g., pyrrolidine). Advantageously, pyrroldine HCl is relatively inexpensive and provides comparable results as catalytic reagents comprising chiral organocatalyst (e.g., Hayashi-Jørgensen catalyst).

Example 8

This example demonstrates embodiments of the disclosed processes for preparing Compound A or a salt thereof comprising admixing Compound B or a salt thereof and crotonaldehyde (2 equiv) in the presence of an acid catalyst (10 mol % FeCl$_3$) and an organocatalyst in acetonitrile for 4 hours. Ten processes were conducted using the conditions set forth in Table 10. General reaction conditions were: Compound B (1.81 mmol), crotonaldehyde (3.62 mmol), 10 mol % FeCl$_3$, 10 mol % organocatalysts, acetonitrile (0.2 mL), under air, unless otherwise noted.

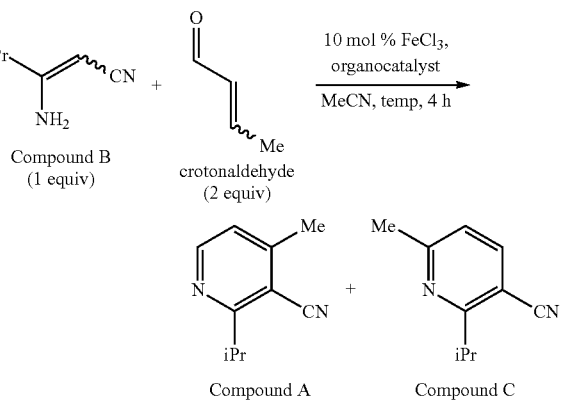

TABLE 10

Optimization of [3 + 3] cyclization reaction

| Entry | Temp (° C.) | Organocatalyst (10 mol %) | Yield (%) Cpd A | Regioselectivity (Cpd A:C) |
|---|---|---|---|---|
| 1[a] | 110 | — | 43 | 15:1 |
| 2 | 80 | — | 36 | 10:1 |

TABLE 10-continued

Optimization of [3 + 3] cyclization reaction

| Entry | Temp (° C.) | Organocatalyst (10 mol %) | Yield (%) Cpd A | Regioselectivity (Cpd A:C) |
|---|---|---|---|---|
| 3 | rt | pyrrolidine-Ph,Ph,OTMS | 11 | >99:1 |
| 4 | 50 | pyrrolidine-Ph,Ph,OTMS | 39 | >99:1 |
| 5 | 80 | pyrrolidine-Ph,Ph,OTMS | 66 | >99:1 |
| 6 | 60 | pyrrolidine | 54 | >99:1 |
| 7 | 60 | pyrrolidine HCl | 64 | >99:1 |
| 8[b] | 60 | pyrrolidine HCl | 68 | >99:1 |
| 9[c] | 60 | pyrrolidine HCl | 52 | >99:1 |
| 10[d] | 60 | pyrrolidine HCl[e] | 67 | >99:1 |

[a]solvent: toluene (0.2 mL),
[b]reaction was run in glovebox ($O_2$ < 1 ppm);
[c]50 mol % of pyrrolidine HCl, no $FeCl_3$; and
[d]50 mol % of pyrrolidine HCl.

Yields were determined by quantitative $^1H$ NMR analysis using 1,2,4,5-tetrachloro-3-nitrobenzene (TCNB) as the internal standard and selectivity was determined by aromatic proton integral ratio of Compounds A and C.

As demonstrated by the results set forth in Table 10, the addition of 10 mol % Hayashi-Jørgensen catalyst to the $FeCl_3$ mediated reaction gave Compound A in 66% yield as a single regioisomer (Entry 5). In order to identify a cost-effective alternative to the chiral Hayashi-Jørgensen catalyst, various achiral secondary amines were evaluated and corresponding ammonium salts as potential organocatalysts for the reaction. Pyrrolidine hydrochloride provided comparable yields (Entry 6). When the reaction was conducted under an inert atmosphere, similar results were obtained, suggesting that oxygen was not the terminal oxidant for the reaction (Entry 8). Absence of $FeCl_3$ resulted in diminished yield of the product (Entry 9). Increasing the organocatalyst loading from 10 mol % to 50 mol % had minimal impact on the reaction (Entries 7 and 10).

Example 9

This example demonstrates embodiments of the disclosed processes for preparing Compound A or a salt thereof on a multigram scale. Compound B and crotonaldehyde were admixed under the conditions set forth in Table 11 and below.

TABLE 11

| Material | Equiv/volumes | Moles | Amount |
|---|---|---|---|
| Compound B | 1.0 | 0.42 | 50 g |
| crotonaldehyde | 2.0 | 0.85 | 62.5 g |
| $FeCl_3$ | 0.1 | 0.42 | 6.88 g |
| pyrrolidine | 0.5 | 0.21 | 15.1 g |
| HCl (3M in CPME) | 0.5 | 0.21 | 70.7 mL |

TABLE 11-continued

| Material | Equiv/volumes | Moles | Amount |
|---|---|---|---|
| CPME | 0.1 | N/A | 50 mL |
| MeCN | 10 | N/A | 500 mL |
| NaOH (6N) | 0.6 | N/A | 30 mL |

Reactor 1 was charged with pyrrolidine (0.5 equiv) and anhydrous cyclopentyl methyl ether (CPME, 0.05 L/kg). The contents of the reactor were cooled to 0° C. Anhydrous hydrogen chloride solution (3.0 M in cyclopentyl methyl ether) (0.5 equiv) was charged at 0° C. and the contents were agitated for 15 minutes at 25° C. The white slurry was filtered, deliquored and washed by CPME (0.05 L/kg). The resulting cake was dissolved in anhydrous acetonitrile (0.1 L/kg) as a pyrrolidine catalyst stock solution.

Reactor 2 was charged with iron (III) chloride (0.1 equiv), pyrrolidine catalyst stock solution in MeCN (50 mol %, 0.1 L/kg), and anhydrous acetonitrile (8.0 L/kg). The contents were agitated for 5 min at room temperature. The batch temperature was set to 60° C. The reaction mixture was slowly charged with Compound B (50 g, 1.0 equiv; dose rate: 6 mL/h) and crotonaldehyde (2 equiv; dose rate: 30 mL/h) at $T_r$=60° C. The two dosing lines were rinsed using MeCN (0.1 L/kg). The reaction mixture was agitated at 60° C. until full conversion of Compound B to Compound A, as determined by HPLC. The reaction mixture was cooled to 20° C. and neutralized by 6 N NaOH (0.5 L/kg). The resulting solution was filtered, deliquored. and concentrated. The crude product was further purified using polish filtration and vacuum distillation. Typically, the above procedure provided 60% yield of Compound A with 79% purity by HPLC using the method described in Table 7.

Example 10

This example demonstrates embodiments of the disclosed processes wherein Compound A or a salt thereof is converted to Compound F or a salt thereof.

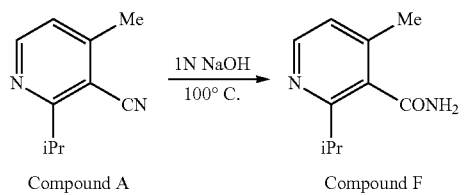

Compound A → Compound F (1N NaOH, 100° C.)

TABLE 12

| Material | Equiv/volumes | Moles | Amount |
|---|---|---|---|
| Compound A | 1.0 | 0.2 | 32.3 g |
| NaOH (1N) | 5.0 | 0.16 | 161 mL |

A reactor was charged with Compound A (1.0 equiv) and 1 N NaOH (5.0 L/kg, 161 mL). The contents were agitated, and the batch temperature was set to 100° C. The reaction mixture was agitated at 100° C. for 18 hours. The resulting solution was filtered and deliquored. The filtered cake was slurry washed with 20 wt % sodium chloride (5.0 L/kg, 161 mL) and then with toluene (5.0 L/kg, 161 mL) The product Compound F was dried to constant weight at ambient temperature under stream of nitrogen and used in the following step without further purification.

Example 11

This example demonstrates embodiments of the disclosed processes for preparing Compound G or a salt thereof comprising admixing Compound F with an oxidizing agent and a base.

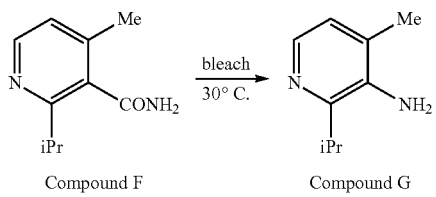 [SMILES: Cc1ccnc(C(C)C)c1C(N)=O ; "bleach" ; Cc1ccnc(C(C)C)c1N]

Compound F → bleach 30° C. → Compound G

TABLE 13

| Material | Equiv/volumes | Moles | Amount |
|---|---|---|---|
| Compound F | 1.0 | 0.15 | 26.4 g |
| NaOH (1N) | 11.2 | 0.3 | 296 mL |
| NaOCl | 1.5 | 0.04 | 167 mL |

A reactor was charged with Compound F (1.0 equiv), 1N NaOH (11.2 L/kg, 296 mL) and sodium hypochlorite (1.5 equiv, approximately 11 wt %, 167 mL). The batch temperature was set to not more than 30° C. and the contents were agitated for 45 minutes. The reaction mixture was cooled to 20° C. 6N HCl (3.1 L/kg, 81.3 mL) was charged into the solution to ensure the endpoint of pH less than 2. Sodium hydroxide (10N) (1.7 L/kg, 44.4 mL) was charged into the solution to ensure the endpoint of pH greater than 13. Isopropyl acetate (10.0 L/kg, 264 mL) was charged into the solution and agitated for 5 minutes. The resulting solution was phase split and deliquored the aqueous layer. The organic phase was concentrated down to about (2.0 L/kg). Distillation of the concentrated oil provided crude Compound G. The crude material can be redistilled or recrystallized to further purify Compound G.

An illustrative process for recrystallizing Compound G is as follows. A reactor was charged with crude Compound G (1.0 equiv) and anhydrous acetonitrile (0.67 L/kg). The batch temperature was set to 20° C. Water (1.23 L/kg) was charged solution at the rate of 0.2 mL/min. The contents were agitated for 12 h at 25° C. The resulting slurry solution was filtered, deliquored and washed with acetonitrile/water=1/6 (1.85 L/kg) and water (1.85 L/kg). A reslurry wash was performed on the wet cake with acetonitrile/water=1/6 (3.3 L/kg) at 15° C. for 4 hours. The resulting slurry solution was filtered and deliquored. The product Form 2 was dried to constant weight at ambient temperature under stream of nitrogen. XRPD analysis confirmed the isolated material was Form 2.

Figure 1B:
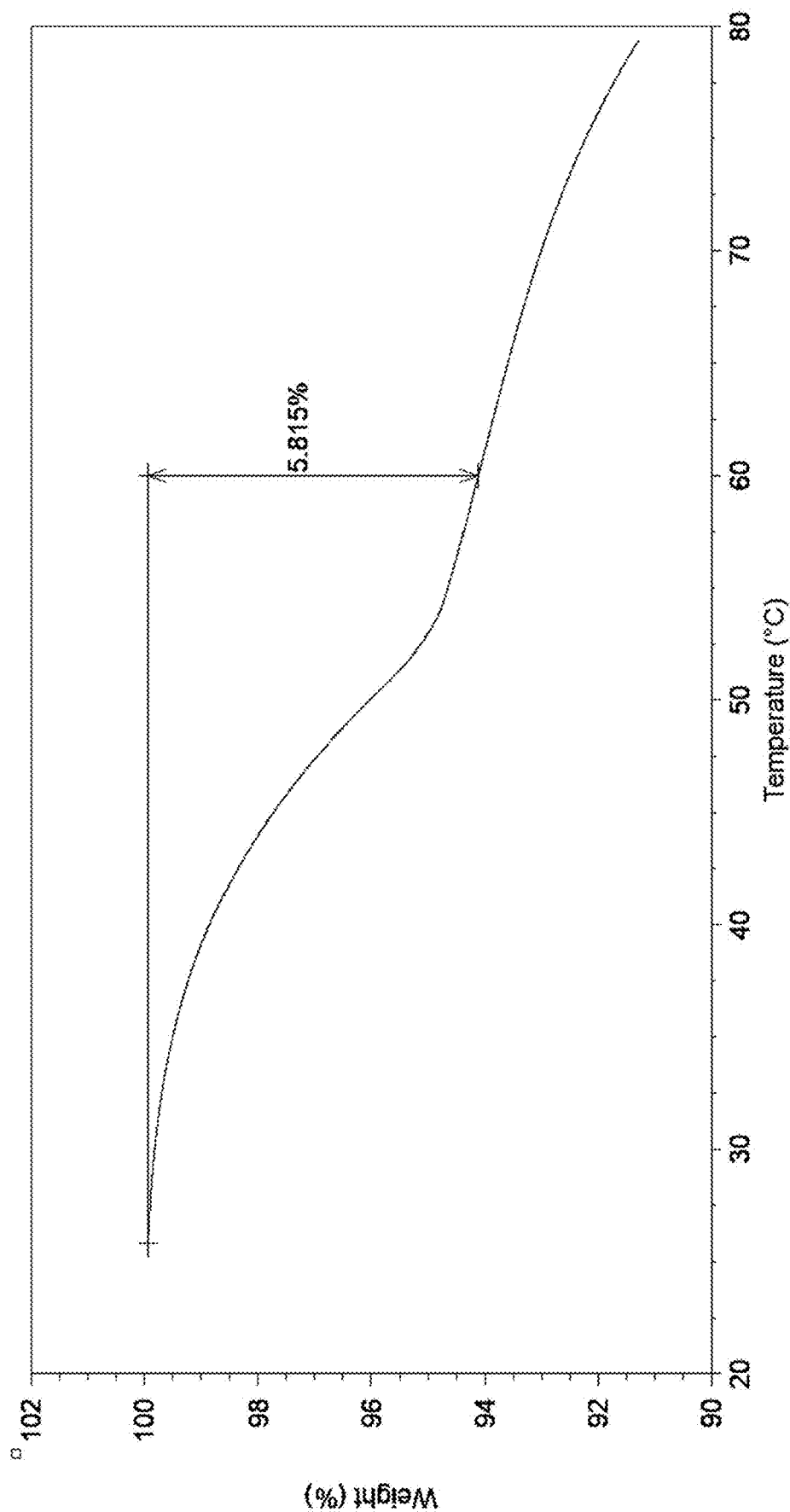
FIG. 1B shows the TGA of Compound G Form 2 isolated from crude.
Figure 2A:
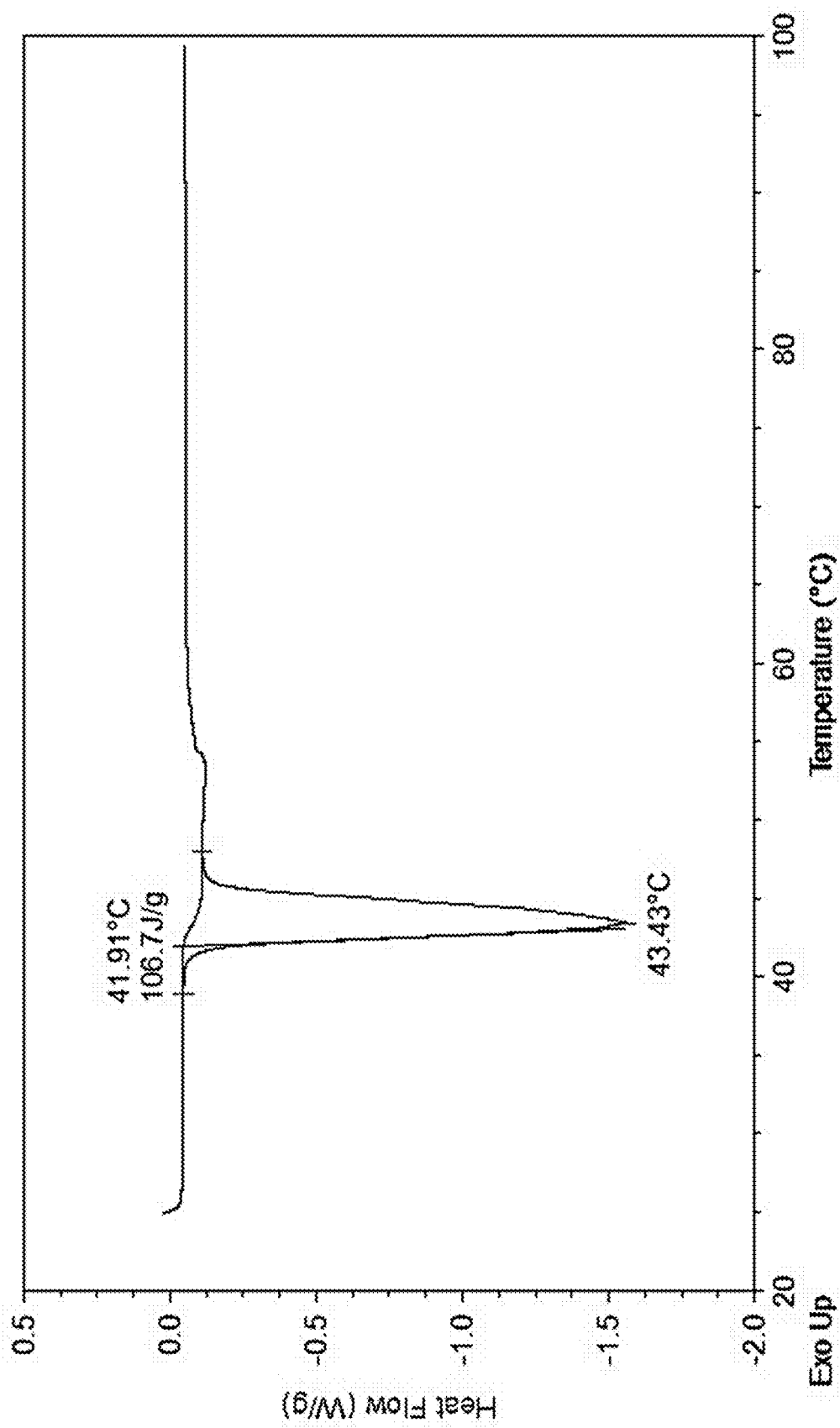
FIG. 2A shows the DSC of Compound G Form 1 isolated from crude.
Figure 2B:
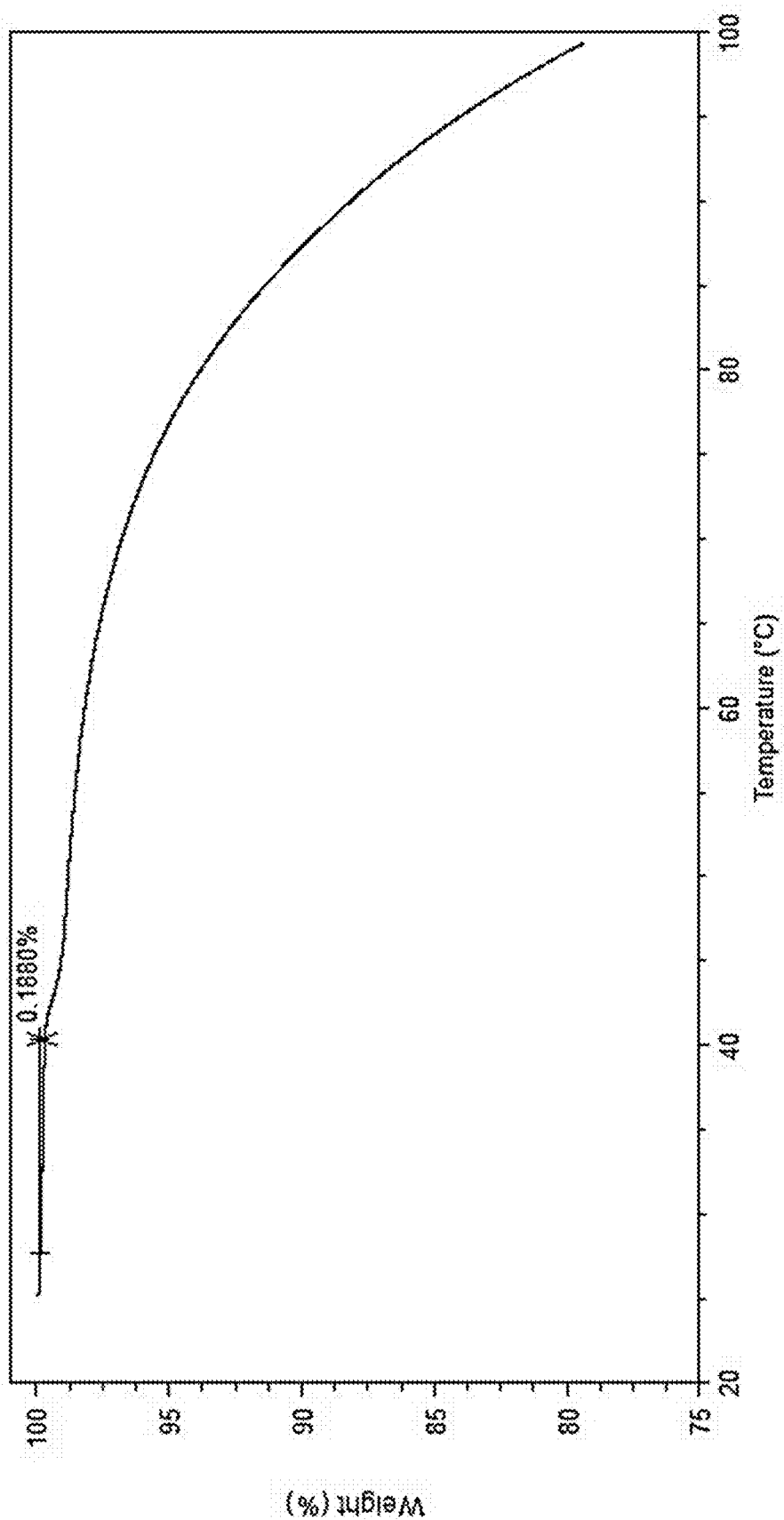
FIG. 2B shows the TGA of Compound G Form 1 isolated from crude.
Figure 3A:
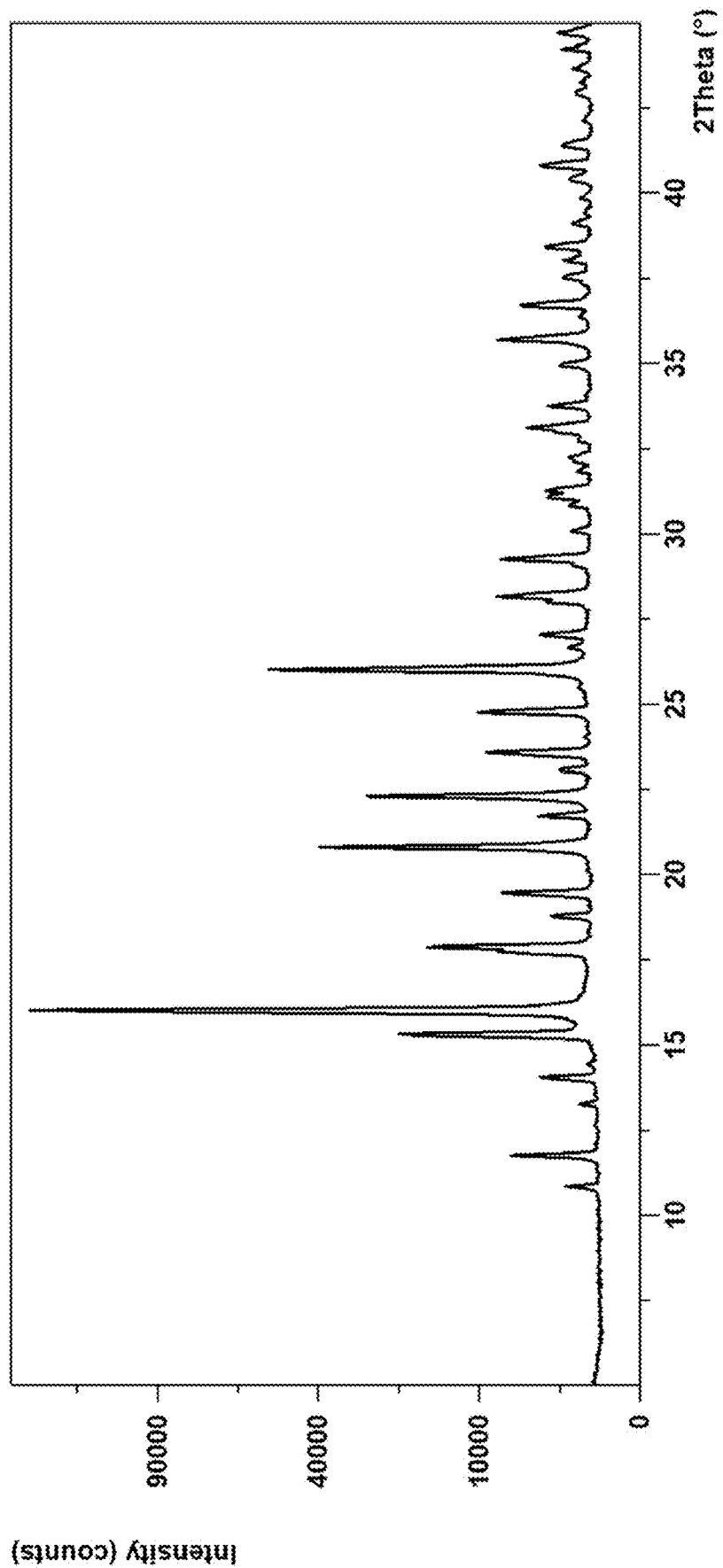
FIG. 3A shows the experimental XRPD pattern of Compound G Form 2.
Figure 3B:
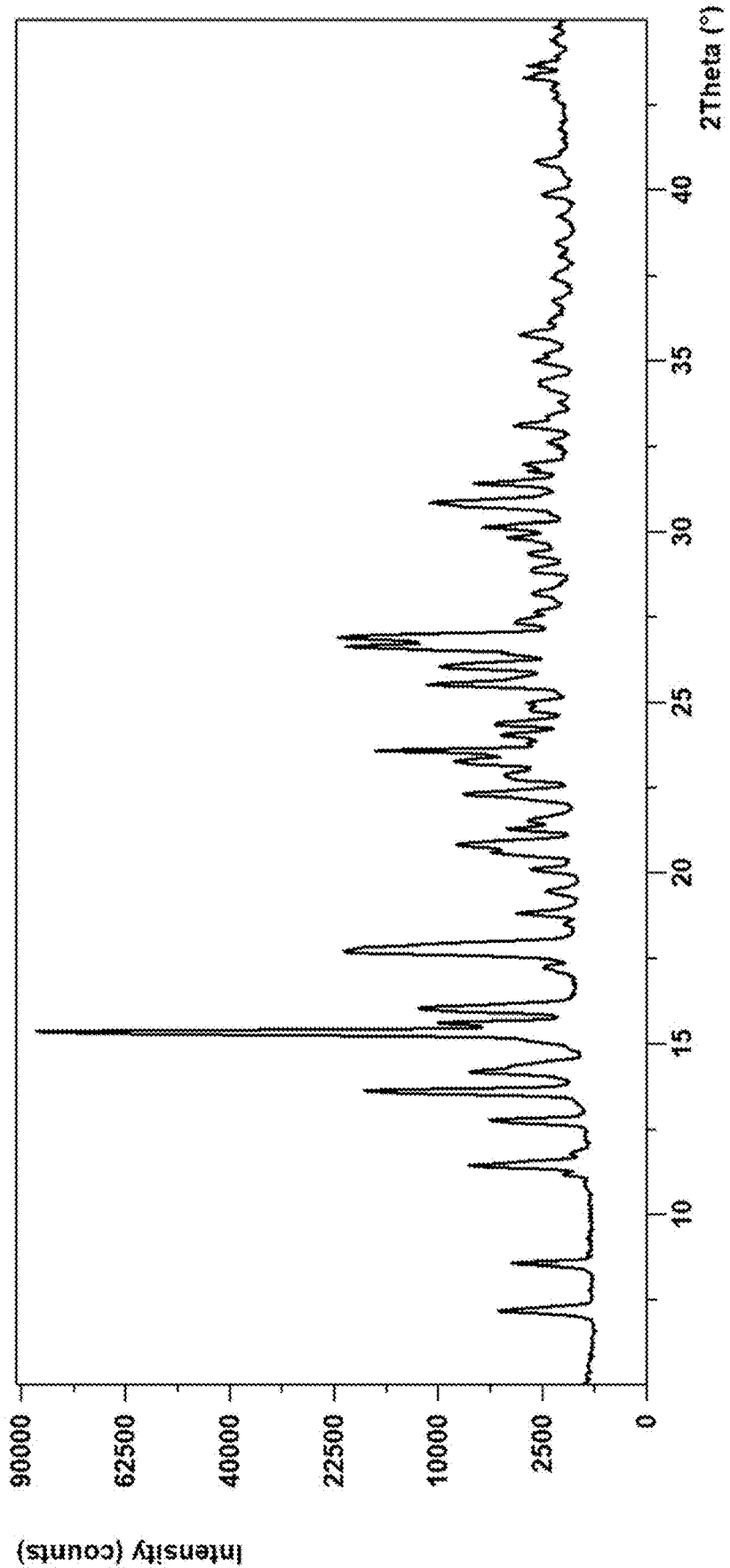
FIG. 3B shows the experimental XRPD pattern of Compound G Form 1.

The isolated solid Compound G was characterized by DSC/TGA and XRPD (see FIGS. 1A, 1B, 2A, 2B, 3A, and 3B). The thermal data of the isolated material indicated that Form 2 could possibly be a hemihydrate of Compound G.

Approximately 10.95 g of Compound G (Form 2) was placed in a vacuum oven at 35° C. and later moved to 40° C. The samples were analyzed by DSC/TGA, KF and XRPD to evaluate the form conversion from Form 2 to Form 1. The data from the drying study is summarized in Table 14. From day 17 to 22, the XRPD and DSC revealed the presence of only Form 1 indicating a complete conversion of Form 2 to Form 1.

TABLE 14

Solid state characterization of drying studies of Compound G Form 2.

| Sample ID | Day # | DSC | TGA (Wt. loss 25°-60° C.) | XRPD | KF % |
|---|---|---|---|---|---|
| 1 | 1 | Endo 1 = 41.95° & Endo 2 = 61.57° C. | NA | Form 1 + Form 2 | 5.6 |
| 2 | 3 | Endo 1 = 41.96° & Endo 2 = 51.57° C. | 2.40% | Predom Form 1 + Form 2 | 4.6 |
| 3 | 7 | Endo 1 = 41.98° C. | 0.67% | Predom Form 1 + Form 2 | 3.4 |
| 4 | 14 | Endo 1 = 41.98° C. | 0.67% | Form 1 | 2.3 |
| 5 | 17 | NA | NA | NA | 1.8 |
| 6 | 22 | NA | NA | NA | 2.2 |

NA: not available

Single crystal X-ray diffraction (SCXRD) studies were conducted on Compound G at 99.98 degrees Kelvin. It was determined that Compound G crystalline Form 1 was an anhydrous form having the crystalline properties shown in Tables 15a and 15b.

TABLE 15a

| Compound G - Crystalline Form 1 (anhydrous) | |
|---|---|
| Crystal system | Monoclinic |
| Space group | $P2_1/n$ |
| Unit cell dimensions | a = 13.03402 (19) Å |
|  | b = 8.22157 (10) Å |
|  | c = 24.9338 (10) Å |
|  | $\alpha = \gamma = 90°, \beta = 101.6656°$ |
| Unit cell volume (Å$^3$) | 2616.72 |
| Z | 12 |
| Z' | 3 |
| Density (g/cm$^3$) | 1.114 |
| R % | 5.29% |

TABLE 15b

| Compound G - Crystalline Form 1 (anhydrous) | |
|---|---|
| Unit cell dimensions | a = 13.904 (6) Å |
|  | b = 8.411 (3) Å |
|  | c = 25.397 (10) Å |
|  | $\alpha = \gamma = 90°, \beta = 103.13 (4)°$ |
| Unit cell volume (Å$^3$) | 2724 (2) |

Crystalline Form 1 Compound G (anhydrous) was characterized by a X-ray powder diffraction (XRPD, CuKα radiation (1.54 Å) pattern comprising peaks (±0.2° 2θ) at 7.17, 8.59, 11.44, 12.76, 13.62, 14.17, 15.34, 17.69, 20.25, 24.05, 24.34, 25.56, 29.85, 30.12, 31.38, and 34.37. XRPD peaks unique to crystalline Form 1 Compound G (anhydrous) included peaks (±0.2° 2θ) at 7.17, 8.57, 12.74, 13.61, 21.53, 24.35, 29.85, and 34.99.

It was determined that crystalline Compound G crystalline Form 2 was a hemihydrate having the crystalline properties shown in Tables 16a and 16b.

TABLE 16a

| Compound G - Crystalline Form 2 (hemihydrate) | |
|---|---|
| Crystal system | orthorhombic |
| Space group | P$2_1 2_1 2_1$ |
| Unit cell dimensions | a = 11.5202 (2) Å |
| | b = 9.7734 (10) Å |
| | c = 8.0610 (10) Å |
| | α = β = γ = 90° |
| Unit cell volume (Å$^3$) | 907.60 (2) |
| Z | 4 |
| Z' | 1 |
| Density (g/cm$^3$) | 1.165 |
| R % | 3.45% |

TABLE 16b

| Compound G - Crystalline Form 2 (hemihydrate) | |
|---|---|
| Unit cell dimensions | a = 8.179 (3) Å |
| | b = 9.935 (3) Å |
| | c = 11.601 (4) Å |
| | α = β = γ = 90° |
| Unit cell volume (Å$^3$) | 942.7 (6) |

The SCXRD data confirmed the presence of 0.5 water molecules for every molecule of Compound G. Furthermore, TGA for Form 2 exhibits around 5.8% of weight loss from 25-60° C., which is consistent with the hemihydrate.

Crystalline Form 2 Compound G (hemihydrate) was characterized by a X-ray powder diffraction (XRPD, CuKα radiation (1.54 Å)) pattern comprising peaks (±0.2° 2θ) at 10.82, 11.76, 14.07, 15.26, 16.02, 17.78, 20.79, 21.73, 22.27, 23.62, 24.78, 26.03, 29.2 30.04, 31.09, 32.22, 36.76, 40.39 and 41.44. XRPD peaks unique to crystalline Form 2 Compound G (hemihydrate) included peaks (±0.2° 2θ) at 10.82, 21.73, 30.04, 32.22 and 40.39.

Alternatively, Form 1 was obtained as follows: single crystals of Form 1 were obtained by drying about 100 mg of Compound G (Form 2, obtained by crystallization of vendor material using acetonitrile and water) in the vacuum oven at 40° C. to generate Form 1 single crystals after 4 days. Compound G (Form 2) was suspended in 1:9 MeCN:H$_2$O and this sample was used as is for SCXRD analysis.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following embodiments) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate the invention and does not pose a limitation on the scope of the invention unless otherwise embodimented. No language in the specification should be construed as indicating any non-embodimented element as essential to the practice of the invention.

What is claimed:

1. A process for preparing Compound A or a salt thereof

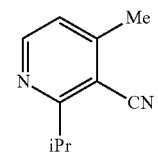

(A)

comprising:
admixing Compound B

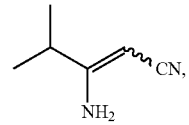

(B)

or a salt thereof, and crotonaldehyde in a solvent and in the presence of a catalytic reagent;
wherein the catalytic reagent comprises an acid catalyst, an organocatalyst, or a combination thereof.

2. The process of claim 1, wherein the acid catalyst comprises a Bronsted-Lowry acid.

3. The process of claim 1, wherein the acid catalyst comprises a Lewis acid.

4. The process of claim 3, wherein the Lewis acid comprises a metal halide, a triflate, a boron etherate, or a combination thereof.

5. The process of claim 4, wherein the metal halide is selected from the group consisting of AlCl$_3$, CuCl$_2$, FeCl$_3$, ZnBr$_2$, and a combination thereof.

6. The process of claim 4, wherein the triflate is selected from the group consisting of a metal triflate, a silyl triflate, and a combination thereof.

7. The process of claim 4, wherein the metal triflate is selected from the group consisting of Al(OTf)$_3$, Bi(OTf)$_3$, Cu(OTf)$_2$, Sc(OTf)$_3$, In(OTf)$_3$, La(OTf)$_3$, Yb(OTf)$_3$, Zn(OTf)$_2$, and a combination thereof.

8. The process of claim 1, wherein the organocatalyst comprises an amine and wherein the amine comprises a secondary amine or a salt thereof.

9. The process of claim 1, wherein the organocatalyst comprises pyrrolidine or a salt thereof.

10. The process of claim 1, wherein the solvent comprises a polar aprotic solvent.

11. The process of claim 1, wherein the solvent is selected from the group consisting of water, methanol, ethanol, isopropanol, acetic acid, acetonitrile, acetone, cyclopentyl methyl ether, ethyl acetate, methyl isobutyl ketone, isopropyl acetate, tetrahydrofuran, methyl tert-butyl ether, N-methylpyrrolidone, dimethylsulfoxide, dimethylformamide, toluene, n-heptane, and a combination thereof.

12. The process of claim 1, wherein the solvent comprises acetonitrile.

13. The process of claim 1, wherein Compound A is substantially free of

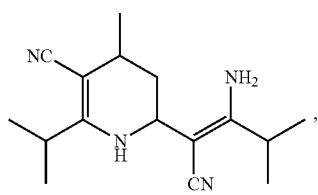

Compound D

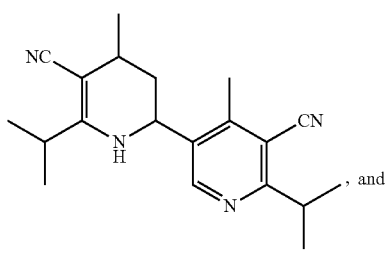

Compound E

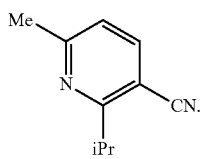

, and

Compound C

14. The process of claim 9, further comprising admixing pyrrolidine and hydrochloric acid in a second solvent to form pyrrolidine hydrochloride.

15. The process of claim 1, further comprising heating Compound A or a salt thereof to a temperature of at least 30° C. in the presence of an acid or a base to form Compound F or a salt thereof

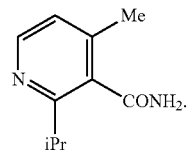

(F)

16. The process of claim 15, wherein Compound A or a salt thereof is heated to a temperature of 65° C. to 110° C.

17. The process of claim 15, wherein the acid is selected from the group consisting of sulfuric acid, hydrochloric acid, phosphoric acid, and a combination thereof.

18. The process of claim 15, wherein the base comprises a metal hydroxide.

19. The process of claim 15, further comprising admixing Compound F with an oxidizing agent and a base to form Compound G:

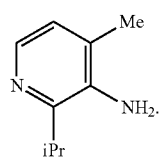

(G)

20. The process of claim 19, wherein the oxidizing agent is selected from the group consisting of sodium hypochlorite, sodium hypobromide, N-bromosuccinimide, lead tetraacetate, and a combination thereof.

21. The process of claim 20, wherein the base is selected from the group consisting of sodium hydroxide, potassium hydroxide, 1,8-diazabicyclo[5.4.0]undec-7-ene, and a combination thereof.

22. The process of claim 1, further comprising using Compound A or a salt thereof to form sotorasib.

* * * * *